US011790630B1

(12) United States Patent
Siddiquie et al.

(10) Patent No.: US 11,790,630 B1
(45) Date of Patent: Oct. 17, 2023

(54) INFERRING FACILITY PLANOGRAMS

(71) Applicant: Amazon Technologies, Inc., Seattle, WA (US)

(72) Inventors: Behjat Siddiquie, Seattle, WA (US); Petko Tsonev, Issaquah, WA (US); Claire Law, Seattle, WA (US); Connor Spencer Blue Worley, Edmonds, WA (US); Jue Wang, Seattle, WA (US); Bharat Singh, Seattle, WA (US); Hue Tuan Thi, Seattle, WA (US); Jayakrishnan Kumar Eledath, Kenmore, WA (US); Nishitkumar Ashokkumar Desai, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/401,854

(22) Filed: Aug. 13, 2021

Related U.S. Application Data

(63) Continuation of application No. 16/455,099, filed on Jun. 27, 2019, now Pat. No. 11,093,785.

(51) Int. Cl.
*G06V 10/40* (2022.01)
*G06Q 10/087* (2023.01)
(Continued)

(52) U.S. Cl.
CPC ........... *G06V 10/40* (2022.01); *G06Q 10/087* (2013.01); *G06Q 30/0633* (2013.01); *G06V 20/40* (2022.01); *G06V 20/44* (2022.01)

(58) Field of Classification Search
CPC ........ G06V 10/40; G06V 20/40; G06V 20/44; G06V 20/52; G06V 10/225; G06V 10/255;
(Continued)

(56) References Cited

U.S. PATENT DOCUMENTS 9,117,106 B2   8/2015   Dedeoglu et al.
9,235,928 B2   1/2016   Medioni et al.
(Continued)

OTHER PUBLICATIONS

Office Action for U.S. Appl. No. 16/455,099, dated Feb. 10, 2021, Siddiquie, "Inferring Facility Planograms", 18 Pages.
(Continued)

*Primary Examiner* — Jose L Couso
(74) *Attorney, Agent, or Firm* — Lee & Hayes, P.C.

(57) ABSTRACT

This disclosure describes techniques for updating planogram data associated with a facility. The planogram may indicate, for different shelves and other inventory locations within the facility, which items are on which shelves. For example, the planogram data may indicate that a particular item is located on a particular shelf. Therefore, when a system identifies that a user has taken an item from that shelf, the system may update a virtual cart of that user to indicate addition of the particular item. In some instances, however, a new item may be stocked on the example shelf instead of a previous item. The techniques described herein may use sensor data generated in the facility to identify this change and update the planogram data to indicate an association between the shelf and the new item.

18 Claims, 8 Drawing Sheets

(51) Int. Cl.
  *G06Q 30/0601* (2023.01)
  *G06V 20/40* (2022.01)

(58) Field of Classification Search
  CPC .. G06V 20/00; G06V 2201/10; G06V 30/224;
    G06Q 10/087; G06Q 30/0633; G06Q
    10/06315; G06Q 30/06; G06Q 30/016;
    G06Q 30/0278; G06Q 30/0635; G06Q
    30/0643; G06Q 20/12; G06Q 30/0639;
    G06T 7/70; G06T 2207/10004; G06T
    2207/10016; G06T 7/292; G06K 7/10861;
    G06K 7/1413; G06K 7/1443; G06K
    7/1456; H04N 17/002; H04N 5/232;
    H04N 5/247; H04N 7/181
  See application file for complete search history.

(56) References Cited

U.S. PATENT DOCUMENTS

| | | | |
|---|---|---|---|
| 9,473,747 B2 | 10/2016 | Kobres et al. | |
| 10,846,657 B2 | 11/2020 | Tiwari et al. | |
| 10,853,764 B2 | 12/2020 | Durkee et al. | |
| 10,909,595 B2 | 2/2021 | Bonner et al. | |
| 10,963,659 B1 | 3/2021 | Ahmed et al. | |
| 11,514,398 B2 * | 11/2022 | Bogolea | H04N 7/188 |
| 2013/0284806 A1 | 10/2013 | Margalit | |
| 2017/0178060 A1 | 6/2017 | Schwartz | |
| 2017/0178227 A1 | 6/2017 | Graham et al. | |
| 2017/0193434 A1 | 7/2017 | Shah et al. | |
| 2017/0337508 A1 | 11/2017 | Bogolea et al. | |
| 2018/0005035 A1 * | 1/2018 | Bogolea | B25J 11/008 |
| 2018/0121869 A1 | 5/2018 | Bradley et al. | |
| 2018/0293543 A1 * | 10/2018 | Tiwari | G05D 1/0274 |
| 2019/0087772 A1 | 3/2019 | Medina et al. | |
| 2019/0156273 A1 | 5/2019 | Fisher et al. | |
| 2019/0156276 A1 * | 5/2019 | Fisher | G06V 10/82 |
| 2019/0156277 A1 | 5/2019 | Fisher et al. | |
| 2019/0236528 A1 | 8/2019 | Brooks et al. | |
| 2019/0347611 A1 * | 11/2019 | Fisher | G06T 7/70 |
| 2019/0392506 A1 * | 12/2019 | Bogolea | G06Q 30/0633 |
| 2020/0074371 A1 | 3/2020 | Bogolea | |
| 2020/0265494 A1 | 8/2020 | Glaser et al. | |
| 2020/0286032 A1 * | 9/2020 | Bogolea | H04N 1/00 |
| 2020/0293992 A1 * | 9/2020 | Bogolea | G06Q 30/0278 |
| 2020/0380457 A1 | 12/2020 | Soon-Shiong | |
| 2023/0131517 A1 * | 4/2023 | Bogolea | B25J 13/089 |
| | | | 705/28 |

OTHER PUBLICATIONS

Office Action for U.S. Appl. No. 16/455,099, dated Nov. 6, 2020, Siddiquie, "Inferring Facility Planograms", 16 Pages.

* cited by examiner

INFERRING FACILITY PLANOGRAMS

RELATED APPLICATIONS

This application claims priority to and is a continuation of U.S. patent application Ser. No. 16/455,099, filed on Jun. 27, 2019, which will issue as U.S. Pat. No. 11,093,785 on Aug. 17, 2021, the entire contents of which are incorporated herein by reference.

BACKGROUND

Retailers, wholesalers, and other product distributors often manage physical stores that utilize cashiers or dedicated self-checkout stands to finalize transactions with customers. During these traditional checkout processes, customers may have to carry and use physical objects for payment or identification, such a credit card or debit card, a driver's license, a phone, and so forth. In the future, physical stores may utilize several types of sensors to allow users to acquire and pay for items without cashiers or dedicated self-checkout stands. In some examples, it may be desirable to identify customers using methods that do not require the use of physical objects and charge the appropriate customer accounts for items taken from the physical stores by the customers.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
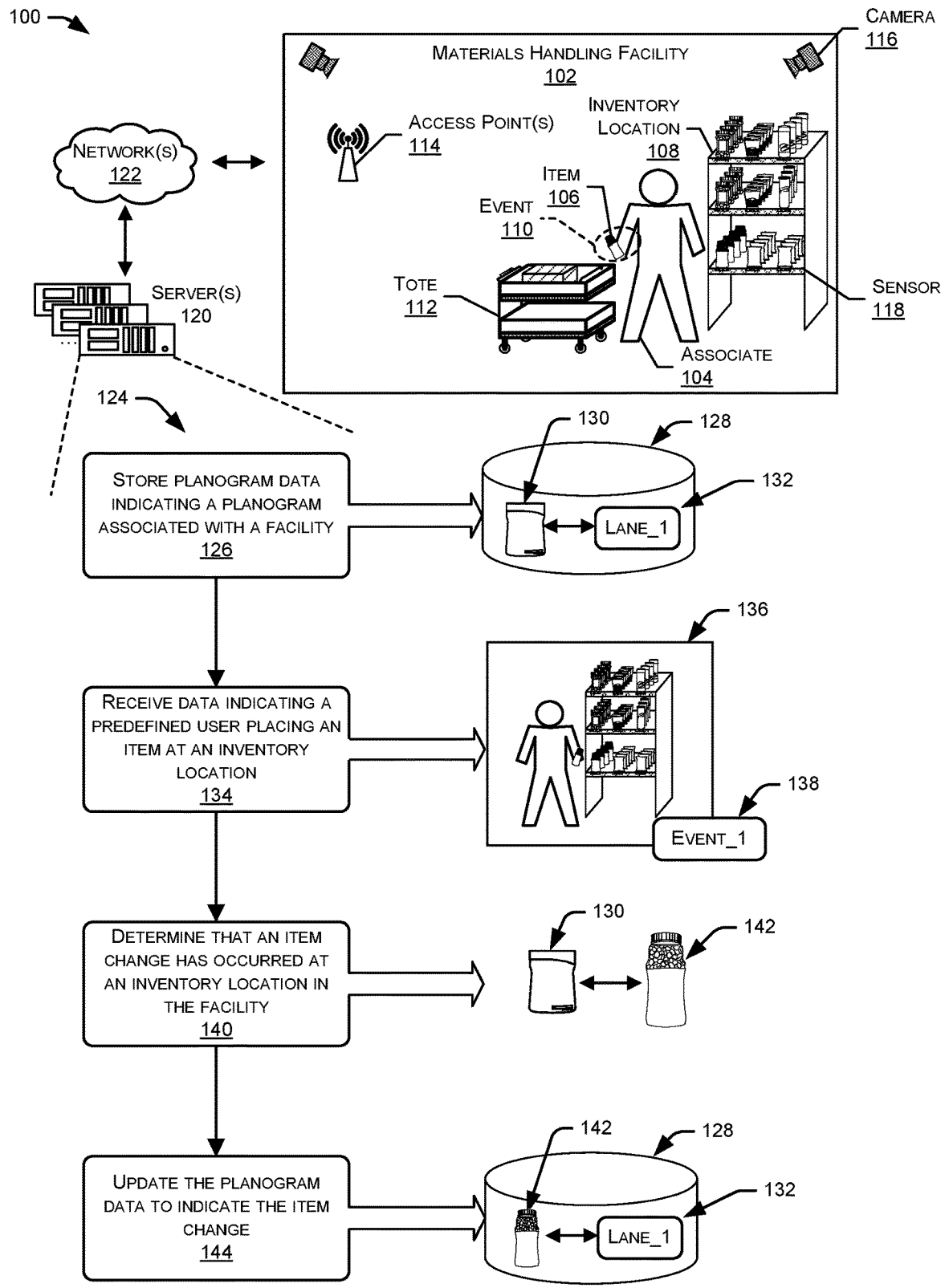
FIG. 1 illustrates an example environment of a materials handling facility. In this example, an associate of the facility places an item onto an inventory location, such as during a stocking or restocking event. One or more computing devices associated with the facility may use sensor data generated at the facility to determine whether the item placed onto the inventory location is different than an item currently associated with that location and, if so, may update a planogram associated with the facility.

This disclosure describes techniques for updating planogram data associated with a facility. The planogram may indicate, for different shelves and other inventory locations within the facility, which items are on which shelves. For example, the planogram data may indicate that a particular item is located on a particular shelf. Therefore, when a system identifies that a user has taken an item from that shelf, the system may update a virtual cart of that user to indicate addition of the particular item. In some instances, however, a new item may be stocked on the example shelf instead of a previous item. The techniques described herein may use sensor data generated in the facility to identify this change and update the planogram data to indicate an association between the shelf and the new item.

To provide an example, envision a facility that includes numerous aisles, shelves, and lanes, full of an array of different items for acquisition. For instance, a first aisle may include a first shelf, which in turn includes multiple lanes. Each of the lanes may include multiple instances of an item, such as multiple cans of soda, peanuts, car-repair items, and/or any other type of item. The planogram data associated with this facility may accordingly associate, for example, a particular can of soda with a particular lane. Therefore, when sensor data within the facility is analyzed to identify that a user has acquired (or "picked") an item from this lane, an inventory-management system may update a virtual cart of the user that picked the item to indicate the addition of the can of soda. Stated otherwise, the inventory-management system may identify, from the sensor data, that an identified user has acquired an item from the particular lane in the facility. The inventory-management system may then access the planogram data indicating, for the time of the event, the item identifier associated with the particular lane associated with the event. Upon identifying the item identifier, as well as the event indicating the acquisition of an item by the identified user, the inventory-management system may update the virtual cart of the user to indicate the acquisition of the can of soda.

In some instances, however, planograms associated with facilities may change. That is, associates of the facility may, in some instances, stock new items in lanes or other inventory locations or may move the positions of existing items within the facility. In the example above, for instance, an associate of the facility may place jars of peanuts in the lane previously housing the soda cans. In order to ensure that virtual carts of users that pick items from this lane are updated to indicate the appropriate item identifiers, the inventory-management system may attempt to update the planogram data associated with the facility as the planogram changes. In other words, when a portion (e.g., a lane) of an inventory location (e.g., a shelf) begins housing an item that differs from a previous item indicated by the existing planogram data, the planogram data may be updated to indicate the new item.

Given the above, the techniques described below may automatically determine planogram changes within a facility and, in response, may update planogram data associated with the facility. In some instances, the techniques may use one or more pieces of sensor data to determine the planogram changes and may update the planogram accordingly. In some instances, the planogram updates occur without human input, while in other instances human input may be used to identify or verify the planogram update.

In one example, a facility may include one or more imaging sensors, such as cameras, to identify events that occur within the facility. For example, the facility may include overhead cameras, in-shelf cameras, or other cameras configured to generate image data of respective inventory locations (e.g., shelves) within the facility. This image data may be provided to one or more components of an inventory-management system for identifying events (e.g., picks and returns of items) within the facility. These components may generate and store event data, indicating the occurrence of certain predefined events, such as a user acquiring an item, returning an item, or the like.

In some instances, these components may also include a locating component configured to identify current locations of users within the facility in order to maintain the state of respective virtual carts of the users. Therefore, when the users exit the facility, respective payment instruments associated with these users may be automatically charged for the items acquired by the users, as indicated by their virtual carts. In addition, the locating component may store the indication of respective current locations of associates (e.g., employees) of the facility. The information stored by the locating component along with the event data determined from the sensor data may be used to identify stocking events, or events where associates place items onto shelves or other inventory locations in the facility.

In some instances, the techniques may begin by receiving event data indicating the occurrence of events and may identify, from the event data, those events associated with associates of the facility. That is, given that each event represented by the event data may be associated with a user identifier of a corresponding user, the techniques may identify those events associated with user identifiers associated with associates (e.g., employees) of the facility. In addition, the techniques may identify "return" events—or events where a user has been determined to place an item onto an inventory location. By identifying return events associated with facility associates, the techniques may identify potential "stocking" or "restocking" events that have occurred within the facility. Stated otherwise, the techniques may identify stocking events by identifying, from the events that occur within the facility, those events that are: (1) return events, and (2) associated with associates of the facility.

After identifying a stocking event, the techniques may determine whether the planogram associated with the facility has changed and, thus whether the planogram data is to be updated. A planogram change may occur when a particular inventory location holds a new item relative to a previous item stored at that inventory location. For example, when a particular lane changes from holding soda cans to holding peanut jars, a planogram change may have occurred, thus resulting in an update of the planogram data of the facility.

In order to determine whether a planogram change has occurred, the techniques may identify and merge one or more stocking events that occur within a predefined amount of time with one another and within a predefined location relative to one another. That is, the techniques may define a spatiotemporal window and may merge stocking events that occur within this spatiotemporal window into a single merged stocking event. In some instances, the spatiotemporal window may comprise several minutes of time and may be associated with a particular portion of an inventory location (e.g., a lane of a shelf), an entire inventory location (e.g., a shelf), an entire aisle of a facility, or the like.

After identifying a set of stocking events within the predefined spatiotemporal window, the techniques may merge these events by, for example, associating each of these pieces of event data within a merged event identifier. After defining a merged event, the techniques may acquire first image data of the inventory location at a first time that is prior to a start time of the merged event and may acquire second image data of the inventory location at a second time that is after the end time of the merged event. In other words, the techniques may acquire a first image(s) of a particular lane or shelf prior to the beginning of the associate stocking the shelf and a second image(s) of the lane or shelf after the associate has finished stocking the shelf.

After receiving the first and second image data, the techniques may analyze the first image data to identify particular portion(s) of the inventory location and may analyze the second image data to identify the same particular portion(s) of the inventory location. For example, envision that a particular shelf of a facility includes five lanes of items—that is, five locations that house five different (or the same) items. In some instances, each lane may be associated with one or more lane dividers, such as a lane divider on a left side and a right side of the respective lane. In some instances, the techniques may use a trained classifier to identify the lanes or other portions of the inventory location. For example, this trained classifier may have been trained on image data using supervised learning, in which examples of labeled image data illustrating lanes (e.g., as defined by lane dividers) are provided to the classifier, along with image data that does not include these lanes (e.g., as defined by the lane dividers). This trained classifier, as well as each classifier described throughout, may comprise a convolutional neural network (CNN), a support vector machine (SVM), or any other type of computer-vision-based classifier.

In the example above, the first image data, depicting the inventory-location-of-interest prior to the stocking event, may be analyzed using the classifier to identify each particular lane or other predefined portion of the inventory location. In addition, the second image data, depicting the inventory-location-of-interest after the stocking event, may be analyzed using the classifier to identify each particular lane or other predefined portion of the inventory location. Therefore, the techniques may identify each lane or other predefined portion of the inventory location both before and after the stocking event.

After identifying the lane(s) from both the first and second image data, the techniques may compare respective portions of the first and second image data to determine whether a change has occurred at any of the portions (e.g., lanes). That is, in the example above, the techniques may have identified five lanes in the first image data and the same five lanes in the second image data. The techniques may then compare a first portion of the first image data (corresponding to the first lane) to a first portion of the second image data (also corresponding to the first lane), a second portion of the first image data (corresponding to the second lane) to a second portion of the second image (also corresponding to the second lane), and so forth.

For each lane or other portion, the techniques may perform the analysis to determine whether a difference between the respective portion in the first image data and the respective portion of the second image data is greater than a threshold difference. For example, the techniques may use one or more computer-vision algorithms to calculate a similarity between the first portion of the first image data and the first portion of the second image data. This similarity may then be compared to a threshold. If the similarity is greater than a threshold (or if the difference is less than a threshold), then the techniques may determine that no change has occurred at that particular lane. If, however, the similarity is not greater than the threshold (or the difference is greater than a threshold), then the techniques may determine that a potential item change has occurred.

In instances where the techniques determine that no change has occurred at a particular lane or other portion of an inventory location, the techniques may refrain from changing planogram data associated with the planogram. If, however, the techniques determine that a change has occurred, then the techniques may continue data-processing the image data and/or other sensor data to verify the change and, if a change is verified, to determine the new item associated with the portion of the inventory location (e.g., the first lane of the shelf). For example, envision that a first lane illustrated in the first image data differs from the first lane as illustrated in the second image data. After making this determination, the techniques may attempt to determine whether the item associated with this particular lane has changed from a first item to a second item—for instance, whether the facility associate has stocked a new item at this lane. In order to make this determination, in one example, the techniques again compare the first portion of the first image data to the first portion of the second image data, potentially using a computer-vision algorithm having a greater accuracy. If the similarity between these portions is greater than a threshold (or if the difference is less than a threshold), then the techniques may determine that no change has occurred. In another example, the techniques may compare the first portion of the second image data to prestored data associated with the first item—or the item currently indicated in the planogram data—to determine whether the item at the particular lane has changed. For example, the techniques may generate first feature data (e.g., a first feature vector) from the first portion of the second image data and may compare this first feature data to second, precomputed feature data (e.g., a precomputed, second feature vector) associated with the first item currently associated with the particular lane in the planogram data. If the similarity between these feature data is greater than a threshold (or the difference is less than a threshold), then the techniques may determine that no change has occurred. In some instances, this result may indicate that the item associated with the location has not changed, but rather an orientation of the item or instance of the item changed between the representation of the item in the first image data and the second image data. This may be due, for example, due to a rotation of a particular item in the lane.

If, however, the techniques determine that the first portion of the first image data differs by more than a threshold from the first portion of the second image data, then the techniques may continue processing the data to attempt to identify the item in the lane as illustrated by the second image data. In some instances, the techniques may use one or more external pieces of information in order to determine which item(s) may be associated with the lane. For example, in some instances the associate stocking the lane may utilize a planogram associate tool executing on a mobile device that enables the associate to scan an item identifier (e.g., barcode, image of the item, etc.) and send data indicative of the item identifier to the inventory-management system. In some instances, if the associate scanned, using an imaging device of the mobile device, an item identifier of a second item, the techniques may determine whether the first portion of the second image data represents the second item. For example, the techniques may generate feature data (e.g., a feature vector) of the first portion of the second image data and may compare this to feature data (e.g., a feature vector) associated with the second item identified via the scan of the second item by the associate.

For example, if the associate scanned a jar of peanuts at a time and location that is near or at the location of the merged stocking event, the techniques may access a datastore to acquire the feature data associated with the jar of peanuts. The techniques may then compare this feature data to the feature data associated with the first portion of the second image data (the image data generated after the stocking event) to determine a similarity therebetween. In other words, if the associate-scan data indicates that the associate has stocked this lane with a jar of peanuts (or multiple instances thereof), the techniques may analyze the second image data to confirm that the lane includes the peanut jars.

If the similarity between feature data of the second image data and the prestored feature data associated with the item (e.g., the jar of peanuts) is greater than a threshold (or the difference is less than a threshold), then the techniques may determine that the lane now holds the second item (here, the jar of peanuts) and may update the planogram data to indicate this change. If, however, the similarity is not greater than the threshold (or the difference is greater than a threshold), or if the associate did not scan an item identifier proximate to the stocking event, then the techniques may attempt to identify the new item in one or more other ways. In some instances, the techniques may generate feature data (e.g., a feature vector) associated with the first portion of the second image data and may compare this feature data to respective feature data (e.g., feature vectors) associated with other items offered at the facility. That is, if the facility stores one hundred items, the techniques may compare the generated feature data to each feature data associated with the one hundred items. It is to be appreciated that the ordering of this comparison may be based on one or more factors or heuristics, such as a current time of day, a location of the lane within the facility, and/or the like. In any event, the techniques may determine the item having the highest similarity and may determine whether this similarity is greater than a threshold. If so, then the techniques may determine that this item is now associated with this lane and may update the planogram data to indicate an association between the lane and the item.

If, however, the techniques are unable to identify an item having a threshold amount of similarity based on the feature-data comparison, the techniques may send one or more pieces of sensor data to one or more computing devices for input by one or more human users. For example, the techniques may send the first image data, the second image data, and/or third image data to the computing devices along with a request that the human user(s) indicate the item located at the lane(s) of interest after the stocking event. In some instances, the techniques may send a list of items determined by the feature-data comparison, with this list ranked according to a similarity between the respective item and the first portion of the second image data.

In some instances, the human user(s) may indicate the item in the second image data and one or more computing devices operated by the users may send an indication of this input identifying the item back to the inventory-management system. This input may then be used to update the planogram data, such that the lane is now associated with the identified item. By updating the planogram data to indicate the item now residing in the lane, events that occur at this lane may be associated with the correct item, rather than with an item previously associated with this lane. Continuing the example from above, for instance, a user that acquires an item from this location may be associated with a jar of peanuts (based on the updated planogram data) rather than the can of soda (as may have occurred using the stale planogram data). Therefore, when the user exits the facility, the user may be charged for the jar of peanuts rather than the can of soda. As described below, each planogram data may be associated with a time range such that events, which are each associated with a respective time, may be analyzed with reference to the correct planogram data.

Although the techniques described herein are with reference to a materials handling facility, the techniques are generally applicable to any other environment. Other examples may include inventory-management systems automating the intake of new shipments of item inventory, libraries for processing returned books and/or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102. As FIG. 1 depicts, an associate 104 (e.g., an employee, volunteer, etc.) associated with the facility 102 may place one or more items 106 onto an inventory location 108 as part of a stocking event 110. That is, the associate 104 may place one or more items 106 from a tote 112 or other carrier onto a shelf or other inventory location for later acquisition by other users within the facility. In some instances, the associate 104 may replace a first item previously located at the inventory location 108 with a second, different item at the inventory location 108. For example, a first lane of the illustrated shelf may initially hold multiple instances of a first item prior to the event 110, whereas the associate 108 may replace this first item with multiple instances of a second item after the event 110. In these examples, a planogram associated with the facility 102 may be updated to indicate this change.

As FIG. 1 further illustrates the facility 102 may further include one or more access points 114 for locating totes and/or users within the facility, as well as one or more cameras 116 and other sensors 118 for generating image data for identifying events within the facility. For example, the cameras 116 and/or sensors 118 may be used to identifying stocking events, as well as pick and return events performed by other users within the facility. Upon identifying these events, an inventory-management service associated with the facility 102 may update virtual carts of the user using stored planogram data, as described in further detail below.

In some instances, sensor data generated at the facility 102 may be provided for analysis to one or more servers 120 via a network 122. The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The servers 120 may reside at the facility 102 and/or at a location that is remote from the facility. In either instance, the servers 124 and/or one or more other computing devices may perform a process 124 for updating a planogram associated with the facility 102, in some instances. As illustrated, the process 124 may include an operation 126, which represents storing planogram data indicating a planogram associated with the facility. As is known, a planogram may associate items within a facility with locations within the facility. FIG. 1, for example, illustrates that a datastore 128 may store an indication that a first item 130 is associated with a first portion of an inventory location 132, which in this example comprises a lane. That is, the planogram indicates that one or more instances of the first item 130 resides at "Lane_1". In some instances, a planogram may be associated with timestamp data indicating a particular time range for which the planogram of the store is valid. Therefore, if a user within the facility acquires an item from "Lane_1" during a time at which this lane is associated with the item 130, a virtual cart associated with the user may be updated indicate the addition of the item 130. Furthermore, it is to be appreciated that while FIG. 1 describes the inventory location 108 as a shelf and the portion of the inventory location 132 as a lane, in other instances the inventory location may comprise a table, desk, or the like, while individual portions of the inventory location may comprise locations of the table or desk or the like.

Continuing the process 124, an operation 134 may represent receiving data indicating that a predefined user has placed an item at an inventory location, such as the inventory location 108. For example, this operation 134 may represent receiving event data 138 indicating that an associate 104 of the facility 102 has placed an item 106 onto a shelf or other inventory location 108 within the facility. In response to receiving this indication, the servers 120 may analyze the sensor data to attempt to determine whether a planogram change has occurred. That is, the servers 120 may attempt to determine whether the item 106 placed onto the particular portion of the inventory location 108 is the same item as currently associated, in the planogram, with the particular portion (e.g., lane) of the inventory location 108. If not, then the servers 120 may attempt to determine the identity of the new item and, in response, may update the planogram associated with the facility 102.

At an operation 140, the process 124 determines that an item change has occurred at the inventory location 108. In some instances, the servers 120 determine that this item change has occurred based on an analysis of sensor data generated from one or more sensors within the facility, such as the camera(s) 116. In other instances, the servers 120 may determine this item change based on input from one or more human users having viewed or otherwise consumed sensor data generated within the facility. In either instance, the operation 140 may determine that the item placed onto the particular portion of the inventory location 108 has changed from the item 130 to an item 142. FIGS. 2, 3, and 4A-C describe techniques for determining an item change in greater detail.

At an operation 144, the process 124 updates the planogram data to indicate the item change. For instance, the process 124 may store, in the datastore 128, an association between the new item 142 and the portion of the inventory location 132, such as "Lane_1". In addition, the process 124 may store timestamp information indicating a time at which the planogram data has been updated. Given this update, if a user later picks an item from the portion of the inventory location 132 (e.g., "Lane_1") after the planogram update, the virtual cart of the user may be updated to indicate the addition of the item 142, rather than the item 130. Furthermore, the virtual cart may store item identifiers associated with each respective item acquired by each respective user during their shopping session. The server(s) 120 may charge an appropriate user account for these items listed in the virtual cart of the user. For instance, the servers 120 may be configured to determine or generate information indicative of a cost of the items picked by a particular user, including the appropriate tax. Additionally, the servers 120 may store payment information (e.g., credit card information, bank account information, etc.) for each user account. In this way, when the user finished their shopping session, the servers 120 may be configured to determine a cost or price for all of the listed item in the virtual cart and may charge the user via their payment information for these items. In this way, the user 108 need not go through steps of a traditional check-out experience (e.g., waiting in line for a cashier, scanning items with the cashier, paying for items at the cashier, etc.).

Figure 2:
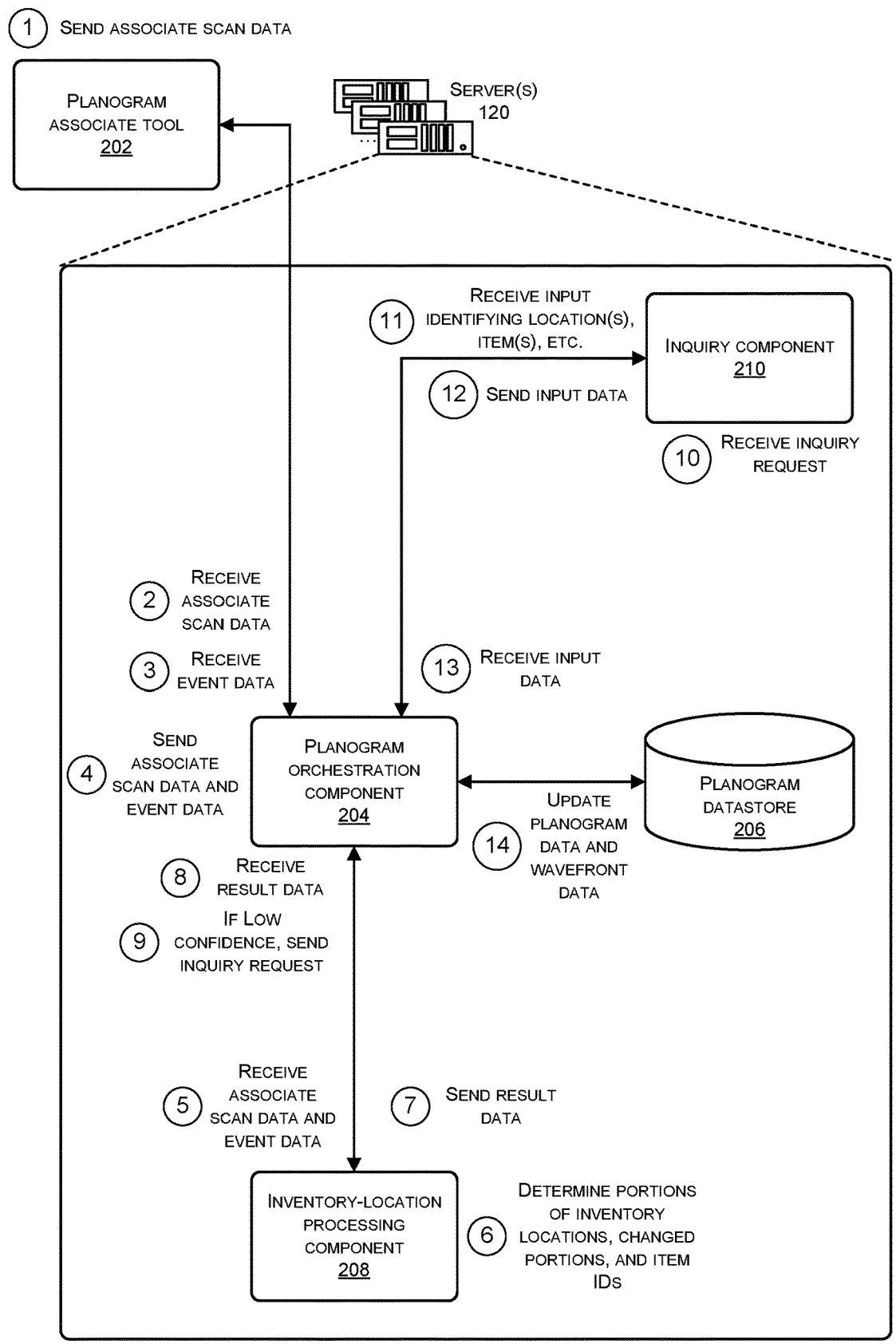
FIG. 2 illustrates example components of the one or more computing devices of the facility for identifying planogram changes using sensor data from the facility and updating planogram data in response.

FIG. 2 illustrates example components of the servers 120 associated with the facility 102. These components may perform some or all of the operations for identifying planogram changes using sensor data from the facility and updating planogram data in response. While FIG. 2 illustrates example components for identifying planogram changes and updating facility planograms, it is to be appreciated that these components are merely illustrative and that other components may be used to do so.

As illustrated, the servers 120 may include or otherwise interact with a planogram associate tool 202, a planogram orchestration component 204, a planogram datastore 206, an inventory-location processing component 208, and an inquiry component 210. The planogram associate tool 202 may comprise an application configured to execute on a mobile device of an associate of the facility 102, such as the associate 104. In some instances, this tool 202 may enable the associate 104 to use an image device (e.g., a camera) of the mobile device to capture an item identifier associated with an item prior to stocking an item on a lane or other portion of an inventory location within the facility. For example, the tool 202 may enable the associate to scan a barcode or capture an image of the item, enter identifying information textually or audibly, or identify the item being placed onto the shelf in any other manner. This data may then be provided to the planogram orchestration component 204 for later use in identifying potential planogram changes.

The planogram orchestration component 204, meanwhile, may function to receive item-identifying information from the planogram associate tool 202, as well as event data from other components of the servers 202. The event data may indicate the occurrence of one or more events deemed to have occurred within the facility and may identify, for a given event, an identity of one or more users associated with the event, an identity of one or more items associated with the event, one or more actions associated with the event (e.g., pick, return, etc.), a time associated with the event, one or more locations associated with the event, and/or the like. As described further below, the orchestration component may provide some or all of this information to the inventory-location processing component 208 for identifying planogram changes and providing an indication of these changes back to the planogram orchestration component 204. If an identified planogram change is associated with a confidence level that is greater than a threshold confidence level, then the planogram orchestration component may store updated planogram data in the planogram datastore 206 indicating the change, along with timestamp information indicating a time for which the updated planogram data is valid.

If, however, the planogram orchestration component 204 receives data from the inventory-location processing component 208 that is associated with a confidence level that is not greater than the threshold confidence level, then the orchestration component 204 may invoke the inquiry component 210. The inquiry component 210 may provide sensor data for analysis by one or more human users to identify potential planogram changes and may provide results of this analysis to the planogram orchestration component 204. The planogram orchestration component 204 may then use this received data to update the planogram data in the planogram datastore 206 if need be.

FIG. 2 further includes an example process for updating planogram data in the planogram datastore 206 using the illustrated components. At "1", the planogram associate tool 202 may send associate scan data to the planogram orchestration component 204. For example, the associate 104 stocking the item 106 on the inventory location 108 may scan a barcode or other identifying information of the item 106 using the planogram associate tool 202 executing on a mobile device of the associate 108. The tool 202 may then send this data to the planogram orchestration component 204, which receives the associate scan data at "2". It is to be appreciated, however, that while the techniques may include receiving associate-scan data for the purposes of identifying the new item at the inventory location (e.g., the lane), in some instances the techniques may identify the new item without this information. That is, and as described above, the techniques may identify that a change has occurred and identify the new item without explicit input from the associate stocking or restocking the shelf or other inventory location.

At "3", the planogram orchestration component 204 receives event data indicative of events that have occurred within the facility. In some instance, other components of the servers 120 have identified the events and generated the corresponding event data based on sensor data generated within the facility. The identification of these events and generation of the corresponding event data by these other components is discussed in further detail with reference to FIGS. 5 and 6. Further, and as noted above, the event data may specify, for each event, one or more users associated with the event, one or more items associated with the event, one or more actions associated with the event, and one or more locations associated with the event. At "4", the planogram orchestration component 204 may send the associate scan data and the event data to the inventory-location processing component 208.

Upon receiving the associate scan data and the event data from the planogram orchestration component 204 at "5", the inventory-location processing component 208 may, in some instances, identify those event data associated with associate return events. That is, the inventory-location processing component 208 may identify, from the event data, those events that are associated with associates of the facility placing one or more items onto inventory locations (as opposed to removing items from the inventory locations). In some instances, the inventory-location processing component 208 may also identify associate-return events that occur within a defined spatiotemporal window of one another to generate a merged associate-return event. After generated a merged associate-return event, at "6" the inventory-location processing component 208 may identify the portion(s) of inventory locations (e.g., lanes) from within image data of the inventory location (e.g., shelf), as well as those locations associated with new items and the identifiers of the new items. Stated otherwise, the inventory-location processing component 208 may analyze sensor data, such as image data, to identify individual lanes of a shelf and to analyze the sensor data associated with these lanes to determine whether new items have been placed within one or more of these lanes. If so, the inventory-location processing component 208 may also identify attempt to identify each new item and its location, with this result being associated with a respective confidence value indicating the likelihood that the inventory-location processing component 208 correctly identified the item. FIGS. 3 and 4A-C describe the operations of the inventory-location processing component 208 in greater detail below.

At "7", the inventory-location processing component 208 sends this result data to the planogram orchestration component 204, which receives the result data at "8". If the result data indicates that there has been no change to the items residing at respective lanes or other portions of inventory locations, then the planogram orchestration component 204 may refrain from updating the planogram data. If, however, the result data does indicate that there has been a change of an item at one or more portions of the inventory location, then the planogram orchestration component 204 may determine whether this result data is associated with a confidence level that is greater than a threshold confidence level. If so, then at "14" the planogram orchestration component 204 may update the planogram data and the wavefront data maintained in the planogram store 206. That is, the planogram orchestration component 204 may store, in the datastore 206 and for each change in the planogram, an association between the new item identifier and an identifier of the corresponding portion of the inventory location. In addition, the planogram orchestration component 204 may update the wavefront, which may represent timestamp data indicating a time for which the updated planogram data is valid. Stated otherwise, the updated planogram data may be denoted as representing the correct planogram for events taking place in the facility after the time indicated by the wavefront. Events taking place prior to this time, meanwhile, may be analyzed with one or more prior iterations of the planogram.

If, however, the confidence level associated with an item change is not greater than the threshold confidence level, then at "9" the planogram orchestration component 204 may send an inquiry request to the inquiry component 210. The inquiry request may comprise one or more pieces of sensor data, such as image data illustrating the inventory location associated with the item change of interest, and a request that one or more human users analyze the sensor data to identify and indicate the item associated with a particular portion (e.g., lane) of interest of the inventory location. In some instances, the human user may comprise the associate stocking the shelf and, thus, the inquiry component may be integrated with or comprise the planogram associate tool. In other instances, the human users may be different from the associate. In either instance, the inquiry component 210 may receive the inquiry request at "10" and, at "11", may receive one or more inputs identifying a location of an item change, an identifier of a new item(s) at the respective location(s), and/or the like. For example, a human user may indicate a lane that changed between an image taken prior to a stocking event a corresponding image taken after the stocking event, along with an identifier of the new item.

At "12", the inquiry component may send the input data to the planogram orchestration component 204, which may receive the input data at "13". At this point, the planogram orchestration component 204 may update, at "14", the planogram datastore 206 using the input received at "13".

Figure 3:
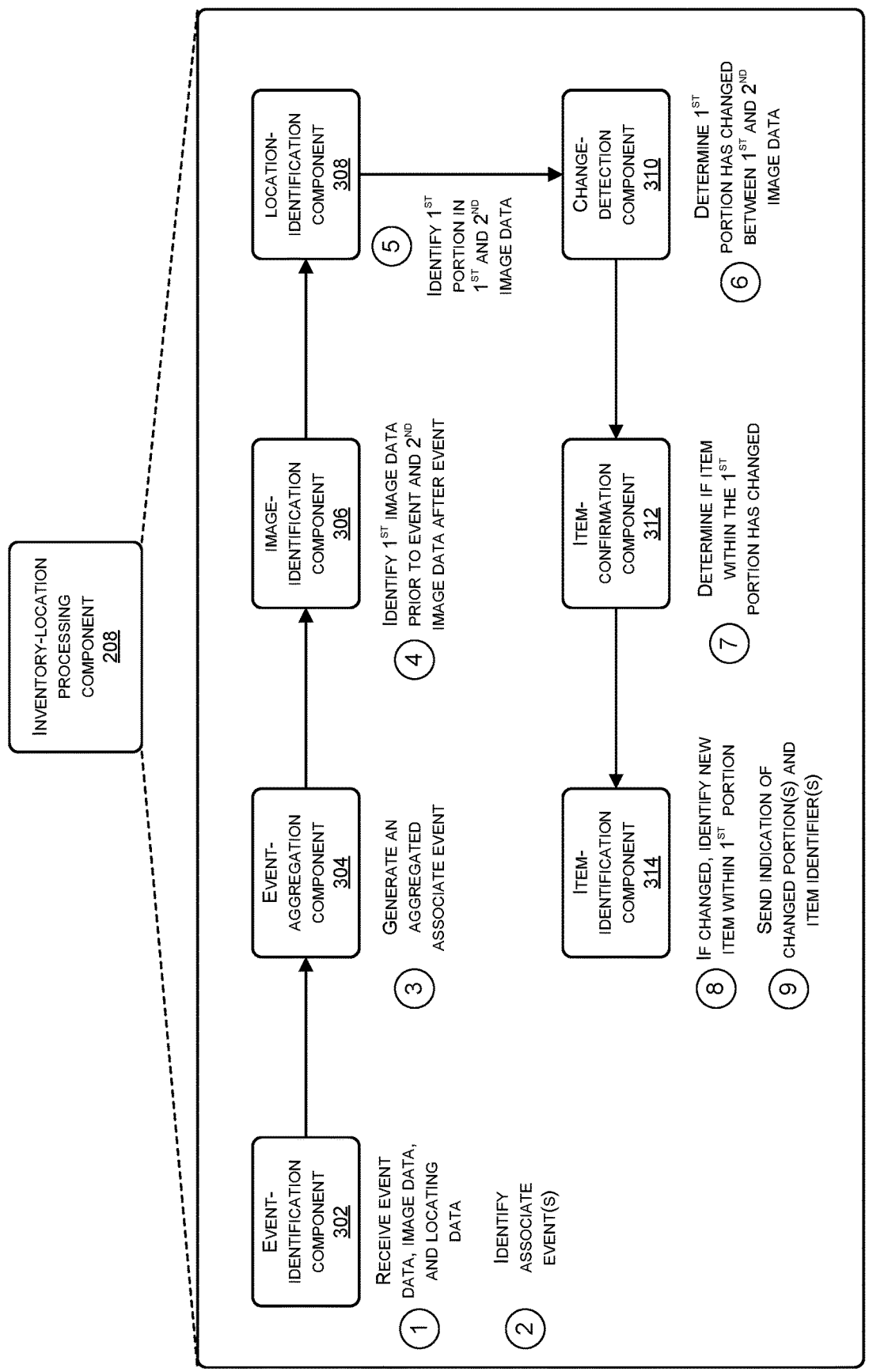
FIG. 3 illustrates example components and operation of an inventory-location processing component from FIG. 2. The components of the inventory-location component may perform operations such as determining different portions (e.g., lanes) of an inventory location using image data and determining when these portions have been stocked with new items. These determinations may be used to update the planogram data associated with the facility.

FIG. 3 illustrates example components and operation of the inventory-location processing component 208 from FIG. 2. The components of the inventory-location component may perform operations such as determining different portions (e.g., lanes) of an inventory location using image data and determining when these portions have been stocked with new items. These determinations may be used to update the planogram data associated with the facility. Again, these components represent a single implementation of the inventory-location processing component 208 and other implementations may be employed to perform the same or different operations.

As illustrated, in this example, the inventory-location processing component 208 includes an event-identification component 302, an event-aggregation component 304, an image-identification component 306, a location-identification component 308, a change-detection component 310, an item-confirmation component 312, and an item-identification component 314. At "1", the event-identification component 302 may receive, from the planogram orchestration component 204 or otherwise, event data, image data, and locating data. The event data may include, for example, information regarding events that have occurred within the facility 102 within a predefined amount of time. The events may be associated with information such as a time of the event, a location of the event, and so forth. The image data, meanwhile, may comprise image data generated by one or more cameras, while the locating data may store, for each "tracklet" (e.g., user being located) currently within the facility, the current location of the tracklet and, potentially, one or more past locations. While this example describes receiving image data at "1", in other instances the event-identification component 302 may additionally or alternatively receive other sensor data for identifying a potential planogram change. For example, the sensor data may comprise weight-sensor data indicating that a potential item change has occurred at a particular lane. That is, the change in the weight at the particular lane may indicate that the lane is housing a new item rather than the item previously associated with the lane in the planogram data. Of course, the weight-sensor data, and potentially other sensor data, may also be used to identify the event represented by the event data, as discussed with reference to FIGS. 5 and 6.

Therefore, at "2" the event-identification component may identify, from the event data, those events that are associated with associates and, from those events, events that are associated with an associate-return event. Event data associated with these associate-return events and the image data corresponding to the location(s) of these associate-return events may then be sent from the event-identification to the event-aggregation component 304.

Upon receiving the event data associated with the associate-return events, the event-aggregation component 304 may, at "3", attempt to aggregate multiple associate-return events into respective merged associated-return events. To do so, the event-aggregation component 304 may define a spatiotemporal window around individual associate return events and merge those events that occur within this spatiotemporal window. For example, the event-aggregation component 304 may define a spatiotemporal window as those events occurring on a same lane of a shelf within five seconds of one another. Therefore, if first and second associate-return events are each associated with "Lane 1" and occur within five seconds of one another, then these two events may be merged. Further, if a third associate-return event occurs within five seconds of a start or end time of the first associate-return event or the second associate-return event, then this third-associate event may be merged with the first and second associate-return events. This process may continue until no associated-return events that occur on the same lane and within five seconds of this expanded spatiotemporal window have been identified. At this point, each of these spatiotemporal associate-return events may be merged into a single merged associate-return event. Event data associated with this merged associate-return event, such as a start time, end time, location, etc. may be sent from the event-aggregation component 304 to the image-identification component 306. The image data received from the event-identification component 302 may also be sent from the event-aggregation component to the image-identification component 306.

The image-identification component may receive the pertinent event data and the image data may identify, at "4" first image data that occurs prior to the start time of the merged associate-return event (i.e., the stocking event), as well as second image data that occurs after the end time of the merged associate-return event. For example, the image-identification component 306 may identify one or more first images of the inventory location (e.g., the shelf) that are associated with time(s) immediately prior to the start time of the event and one or more second images of the inventory location (e.g., the shelf) that are associated with time(s) immediately after the end time of the event. The image-identification component 308 may then send this image data to the location-identification component 308.

Upon receiving the first image data and the second image data, the location-identification component 308 may, at "5", identify one or more portions of the inventory location in the first image data and the same one or more portions of the inventory location in the second image data. For example, if the inventory location comprises a shelf having five lanes, each configured to hold one or more instances of an item, the location-identification component 308 may attempt to identify the locations of each of these five lanes within the first image and each of these five lanes within the second image data. As described above, the location-identification component 308 may comprise a classifier having been trained to identify the lanes of the shelves by, for example, identifying a left lane marker and a second lane marker. In some instances, this classifier may have been trained using supervised learning or other techniques for training the classifier. Further, while this example describes identifying lanes within shelves, in other instances the identified "portions" of the inventory locations may comprise respective locations of a table (which may comprise the inventory location) or any other subset of an inventory location configured to hold an item.

Upon identifying at least a first portion (e.g., a first lane) in the first image and the first portion (e.g., the first lane) in the second image data, the location-identification component 308 may pass this image data and/or an indication of these portions to the change-detection component 310. At "6", the change-detection component 310 attempts to determine whether the first portion (e.g., the first lane) of the inventory location has changed between the first image data (i.e., the image data generated prior to the stocking event) and the second image data (i.e., the image data generated after the stocking event). To make this determination, the change-detection component 310 may compare the first portion of the first image data to the first portion of the image data to determine a difference therebetween. For example, the change-detection component 310 may generate a first feature vector of the first portion of the first image data and a second feature vector of the first portion of the second image data and may compare these feature vectors to determine a difference. If the change-detection component 310 determines that this difference is not greater than a threshold difference, then the change-detection component 310 may determine that there has been not item change (and, hence, no planogram change) at that particular portion (e.g., lane) of the inventory location. If, however, the change-detection component 310 determines that this difference is greater than the threshold difference, then the change-detection component 310 may generate an indication of a potential change at the particular inventory-location portion and may provide this indication to the item-confirmation component 312. It is to be appreciated, meanwhile, that the change-detection component may determine whether a change has occurred at each inventory-location portion (e.g., each lane) identified by the location-identification component 308. In the example where this component 308 has identified five lanes within the first and second image data, for instance, the change-detection component 310 may determine whether a change has occurred in any, some, or all of these five lanes and may provide respective change indications to the item-confirmation component 312.

Upon receiving an indication one a change in one (or more) portion of an inventory location, at "7" the item-confirmation component 312 may attempt to determine whether the item represented in the first portion of the second image data has in fact changed from the item represented by the first portion of the first image data. That is, despite the change-detection component 310 identifying a potential item change, it is possible that the first and second image data represent the same item, with the item having been rotated or otherwise oriented differently between the first and second image data. Therefore, prior to attempting to identify the item from a potentially large catalog of items available at the facility, the item-conformation component 312 may confirm that the item depicted in the first portion of the second image data is indeed different than the image depicted in the first portion of the first image data.

To make this determination, the item-confirmation component 312 may again using one or more computer-vision algorithms to compare the first portion of the first image data to the first portion of the second image data. In this instance, the item-confirmation component 312 may use a more expensive algorithm having a greater degree of accuracy and resolution than an algorithm used by the change-detection component to determine a potential change. Stated otherwise, the change-detection component 310 may compare the first portion of the first image data with the first portion of the second image data using a relatively inexpensive algorithm for the purpose of identifying any potential changes, while the item-confirmation component 312 may use a more expense, greater-resolution algorithm for determining a difference between the first portion of the first image data and the first portion of the second image data. If this difference is not greater than a threshold difference, then the item-confirmation component 312 may determine that the item has not in fact changed during the stocking event. If, however, the difference is greater than a threshold difference, then the item-confirmation component 312 may determine that a change has occurred and may send an indication of an item change to the item-identification component 314.

In another example, the item-confirmation component 312 may identify, from the current planogram data, an item identifier of an item currently associated with the first portion of the inventory location being analyzed. That is, for the particular lane being analyzed in the first and second image data, the item-confirmation component 312 may identify the item currently assigned to this lane and may access, from the planogram datastore 206 or otherwise, predefined feature data (e.g., a prestored feature vector) associated with this item. After receiving this feature data, the item-confirmation component 312 may then generate feature data (e.g., a feature vector) using the first portion of the second image data and may compare the feature data to one another to determine a difference therebetween. Again, the component 312 may compare this difference to a difference threshold and, if the difference is greater than the threshold difference, the component 312 may send an indication of an item change to the item-identification component 314. If the difference is not greater than the difference threshold, then the item-confirmation component 312 may determine that no item change has occurred.

In instances where the item-identification component 314 receives an indication of an item change, at "8" the item-identification component 314 may attempt to identify the new item within the first portion of the second image data. In one example, the item-identification component may use the first portion of the second image data to generate feature data (e.g., a feature vector) and may compare this feature data to each feature data associated with respective items within a catalog of items offered at the facility. That is, the item-identification component may access a datastore storing, for each item offered within the facility, a respective feature vector generated from an image of the respective item. The component 314 may then compare the feature data generated from the first portion of the second image data to the feature vector associated with each individual item to determine a respective difference. The item-identification component 314 may then rank these items according to similarity (with the items associated with a smallest difference listed higher) and may determine whether the most-similar item has a difference that is less than a threshold difference. If so, the item-identification component 314 may determine whether the determination of this item as being represented by the second image data has a confidence level that is greater than a high-confidence threshold.

If so, then the item-identification component 314 may send, to the planogram orchestration component 304, an indication of the identified item and the corresponding inventory-location portion (e.g., lane), along with an indication that the item has been identified with high-confidence. If the confidence level is not associated with high-confidence, then the item-identification component 314 may send the indication of the result to the planogram orchestration component 204, along with an indication that the result is associated with low-confidence. In these instances, the item-identification component 314 may send an indication of the top-n items from the ranked list, such as the top five most similar items. As described above, if the results received by the planogram orchestration component 304 from the item-identification component 314 are associated with low-confidence, then the planogram orchestration component 204 may invoke the inquiry component 210 to determine the identity of the item in the first portion of the second image data.

Figure 4A:
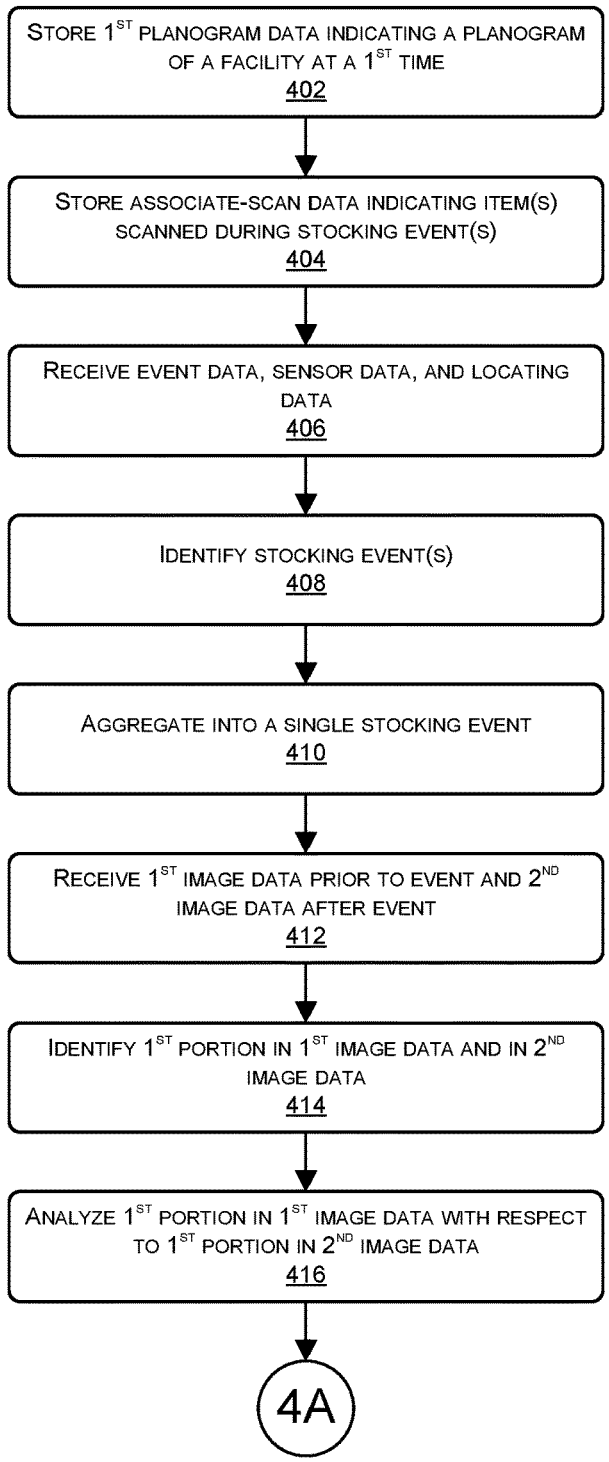
FIGS. 4A-C collectively illustrate a flow diagram of an example process for identifying item changes at inventory locations in a facility and, in response, updating planogram data associated with the facility.
Figure 4B:
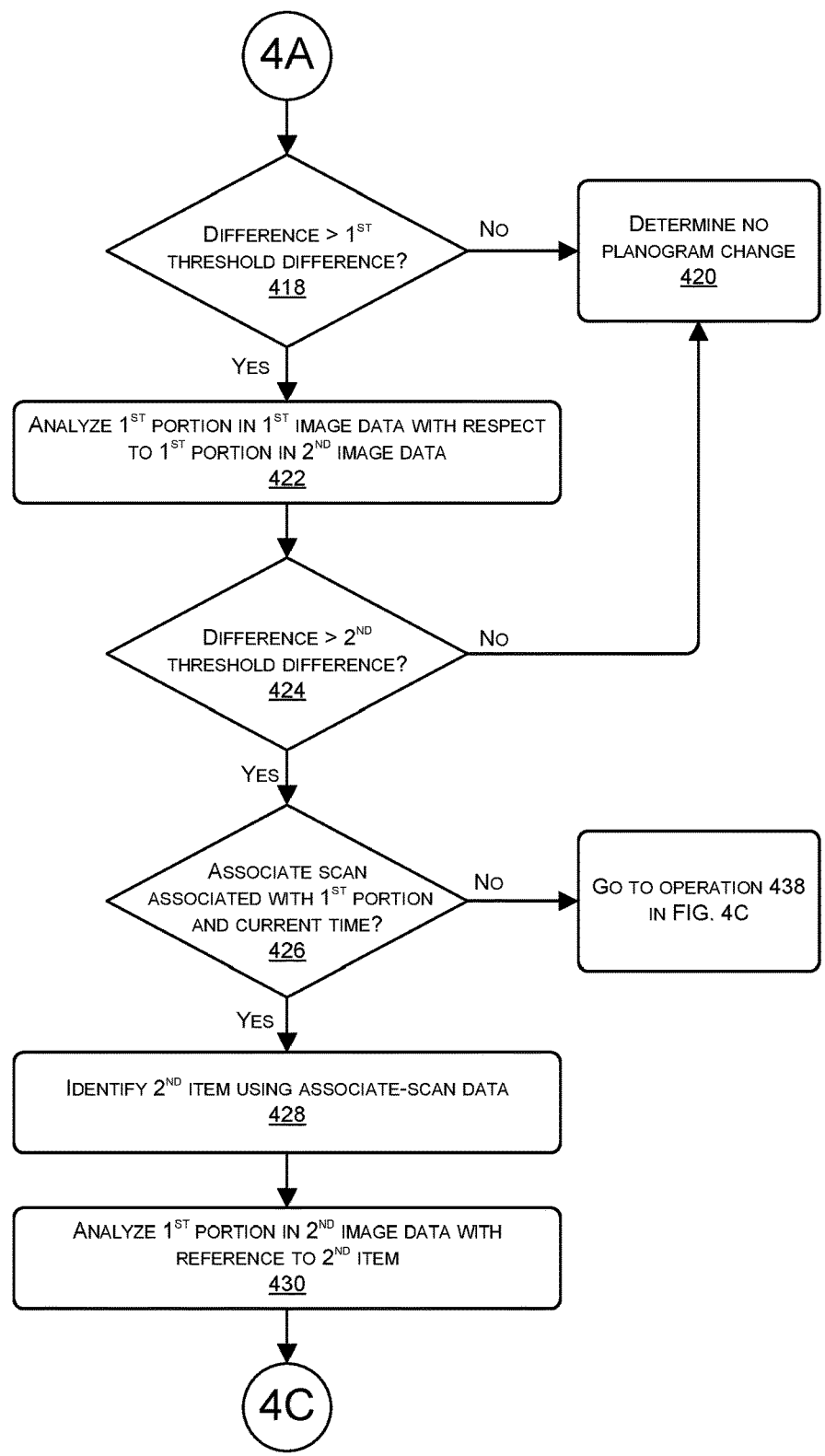
Figure 4C:
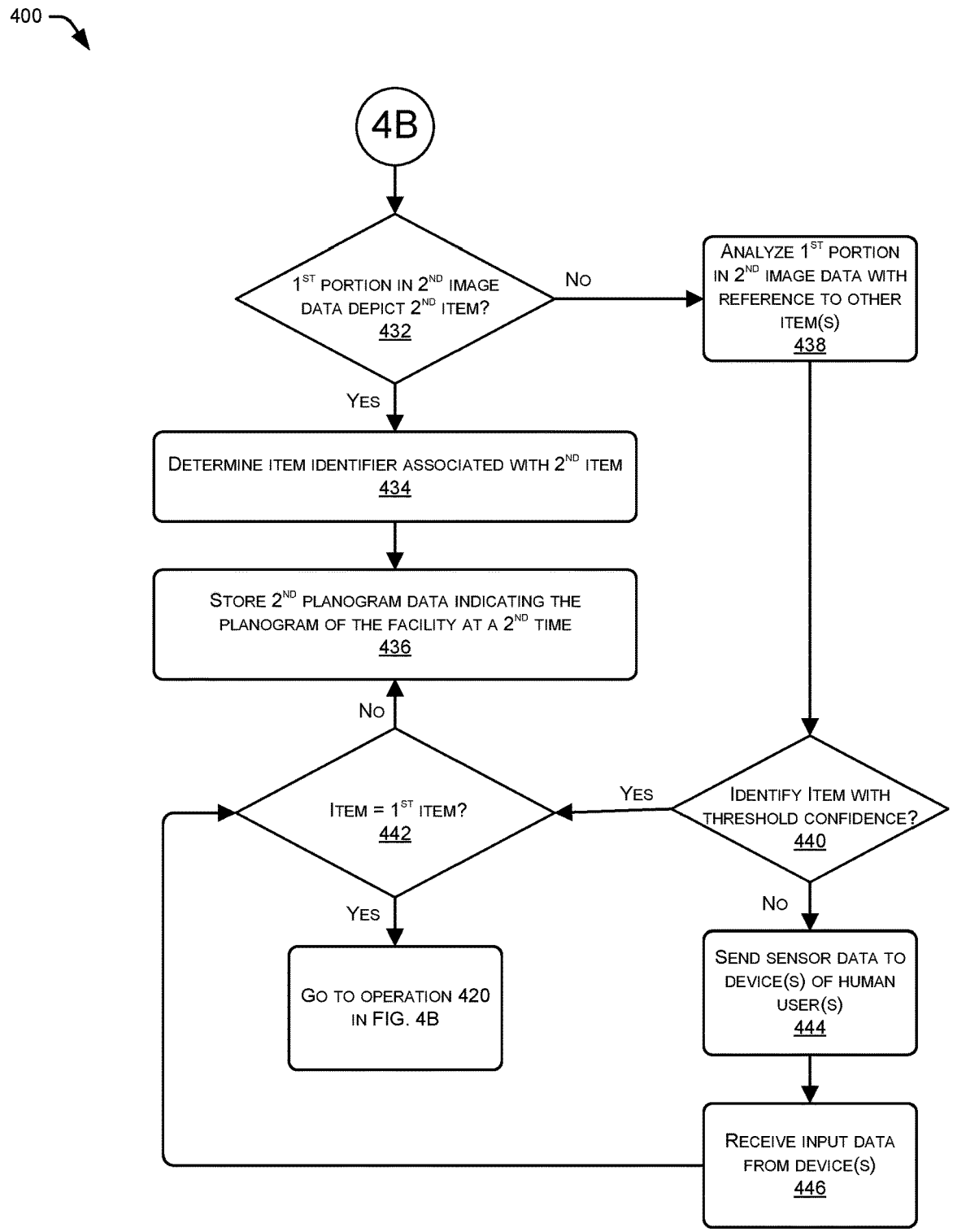

FIGS. 4A-C collectively illustrate a flow diagram of an example process 400 for identifying item changes at inventory locations in a facility and, in response, updating planogram data associated with the facility. The process 400 discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, these processes may be performed by the servers 120, other computing devices, or a combination thereof.

An operation 402 represents storing first planogram data indicating a planogram of a facility at a first time. As described above, the first planogram data may indicate associations between respective portions of inventory locations (e.g., respective lanes on shelves) and items residing thereon. For example, the first planogram data may indicate that a first item is associated with a first portion of an inventory location at the first time.

An operation 404 represents storing associate-scan data indicating one or more items scanned during stocking events. For example, prior to an associate stocking or restocking a lane in a shelf, the associate may use the planogram associate tool executing on a mobile device to scan or otherwise identify the item being stocked. This scan data may be sent from the mobile device to the servers 120 for storage. Of course, and as described above, in some instances a planogram of a facility may updated without use of the associate scan data.

An operation 406 represents receiving event data, sensor data, and locating data. The event data may indicate information regarding events that have been identified through automated or human analysis of sensor data acquired within the facility. The sensor data, meanwhile, may comprise image data, weight-change data, or any other type of data generated by a sensor within the facility 102. The locating data, meanwhile, may represent current and/or past locations of users within the facility. As noted above, some of these users may comprise associates of the facility, while others may comprise customers that reside in the facility for the purposes of purchasing or otherwise acquiring items from the facility.

An operation 408 represents identify one or more stocking events using at least a portion of the data received at the operation 406. For example, the event-identification component 302 may identify, from the event data and the locating data, those events that are associated with associates of the facility placing items on the shelves of the facility.

As discussed above, the "return" event (i.e., the event indicating that one or more items have been placed on a shelf) may be identified using any type of sensor data, including image data, weight-sensor data, and the like. For example, the return event may have been identified based on a reported increase in weight on the shelf or other inventory location.

An operation 410 represents aggregating associate-return events into a single merged event. As described above, the event-aggregation component 304 may group associate-return events that occur within a defined spatiotemporal window of one another into a merged event, such that serial stocking events that occur at a common location may be analyzed as a single stocking event.

An operation 412 represents receiving first image data associated with a time prior to the aggregated event and second image data associated with a time after the aggregated event. For example, the image-identification component 306 may identify a start time and an end time of an aggregate event. Further, this component 306 may identify, from the received image data of the appropriate inventory location, first image data that occurs just prior to the start time of the aggregated stocking event and second image data that occurs just after the end time of the aggregated stocking event.

An operation 414 represents identify a first portion of an inventory location in the first image data and identifying the same first portion of the inventory location in the second image data. For example, the location-identification component 308 may apply a trained classifier to the first image data and to the second image data to identify a lane or other inventory-location portion in the each of the first image data and to the second image data. Further, and as described above, this classifier may be configured to identify multiple lanes or other inventory-location portions from each of the first image data and to the second image data.

An operation 416 represents analyzing the first portion of the first image data with reference to the first portion of the second image data. For example, the change-detection component 310 may calculate a first feature vector of the first portion of the first image data and a second feature vector of the first portion of the second image data and may compare the first and second feature vectors to one another.

FIG. 4B continues the illustration of the process 400 and includes, at an operation 418, determining whether the difference between the first portion of the first image data and the first portion of the second image data is greater than a first threshold difference. If not, then the process may proceed to determine, at an operation 420, that no planogram change has occurred.

If, however, the operation 418 determines that the difference is greater than a first threshold difference, then process 400 may proceed to an operation 422. The operation 422 represents again comparing the first portion of the first image data with the first portion of the second image data. As described above, this operation may comprise using a computer-vision algorithm having a greater level of fidelity than an algorithm used during the analysis of the operation 416. In another example, also as described above, the process 400 could access a feature vector associated with an item currently associated with first portion (e.g., the lane) in the planogram data and may compare this feature vector with a feature vector computed from the first portion of the second image data.

At an operation 424, the process 400 may determine whether the difference between the first portion of the first image data and the first portion of the second image data, as determined at 422, is greater than a second difference threshold, which may be the same or different than the first image threshold. If not, then at the operation 420, the process 400 may determine than no planogram change has occurred. If so, however, then the process 400 may proceed to an operation 426, which comprises determining whether associate scan data associated with the location and time of the event of interest has been received. That is, the operation 426 may determine whether an associate scanned an item proximate to a time and location of the stocking event determined above. If not, then the operation may proceed to the operation 438 described below. If pertinent associate scan data has been received, however, then the process 400 may proceed to an operation 428.

The operation 428 includes identifying a second item using the associate scan data. For example, this operation may include determining the second item from an item identifier indicated by the associate scan data, such as a name of the item, a barcode number or the item, or the like.

An operation 430, meanwhile, represents analyzing the first portion of the second image data with reference to the second item identified via the associate scan data at the operation 428. For example, the operation 430 may comprise accessing prestored feature data (e.g., a feature vector) associated with the second item and comparing this feature data to feature data generated using the first portion of the second image data. Stated otherwise, this operation in combination with the following operation may comprise a confirmation ensuring that the item identified by the associate scan data is in fact the item residing on the lane of the shelf (or other portion of the inventory location).

FIG. 4C concludes the illustration of the process 400 and includes, at an operation 432, determining, based on the analyzing at the operation 430, whether the first portion of the second image data depicts the second item. If so, then an operation 434 represents determining an item identifier of the second item and, at an operation 436, storing second planogram data indicating a planogram of the facility at the second time.

If, however, the first portion of the second image data does not depict the second item determined from the associate scan data (or if no pertinent associate scan data exists), then the process 400 may proceed to the operation 438. The operation 438 may comprise analyzing the first portion of the second image data with reference to one or more other items available at the facility. For example, this operation 438 may include computing feature data (e.g., a feature vector) using the first portion of the second image data and comparing this feature data to respective feature data associate with respective items offered for acquisition in the facility. This operation 438 may also include generating a list of the items, ranked according to similarity to the first portion of the second image data.

An operation 440 represents determining whether an item has been identified from the operation 438 with a threshold confidence level. That is, the operation 440 may determine whether an item determined to be most similar to the first portion of the second image data is associated with a confidence level that is greater than a threshold confidence level. If so, the process 400 proceeds to determine, at an operation 442, whether the identified item is the first item (that is, the item previously associated with the current lane of the interest in the first planogram data). If so, then the process 400 proceeds to the operation 420, at which point the process determines that no planogram change has occurred. If the item is not the first item, however, then the process 400 may then proceed to store, at the operation 436, second planogram data indicating that the second item is now associated with the first portion of the inventory location.

If, however, at the operation 440 the process 400 does not identify an item with a threshold confidence level, then the process 400 may proceed to an operation 444. The operation 444 represents sending sensor data (e.g., the first image data, the second image data, and/or third image data) to computing device(s) operated by one or more human users. At an operation 446, the process 400 receives input from the computing device(s) identifying the item depicted in the first portion of the second image data. Again, the process may determine, at the operation 442, whether the item identified by the human user(s) is the first item and, if so, the process may determine, at the operation 420, that no planogram change has occurred. If, however, the identified item is not the first item, then the process 400 may proceed to store second planogram data indicating that the item identified by the input from the human user(s) is now associated with the first portion of the inventory location.

Figure 5:
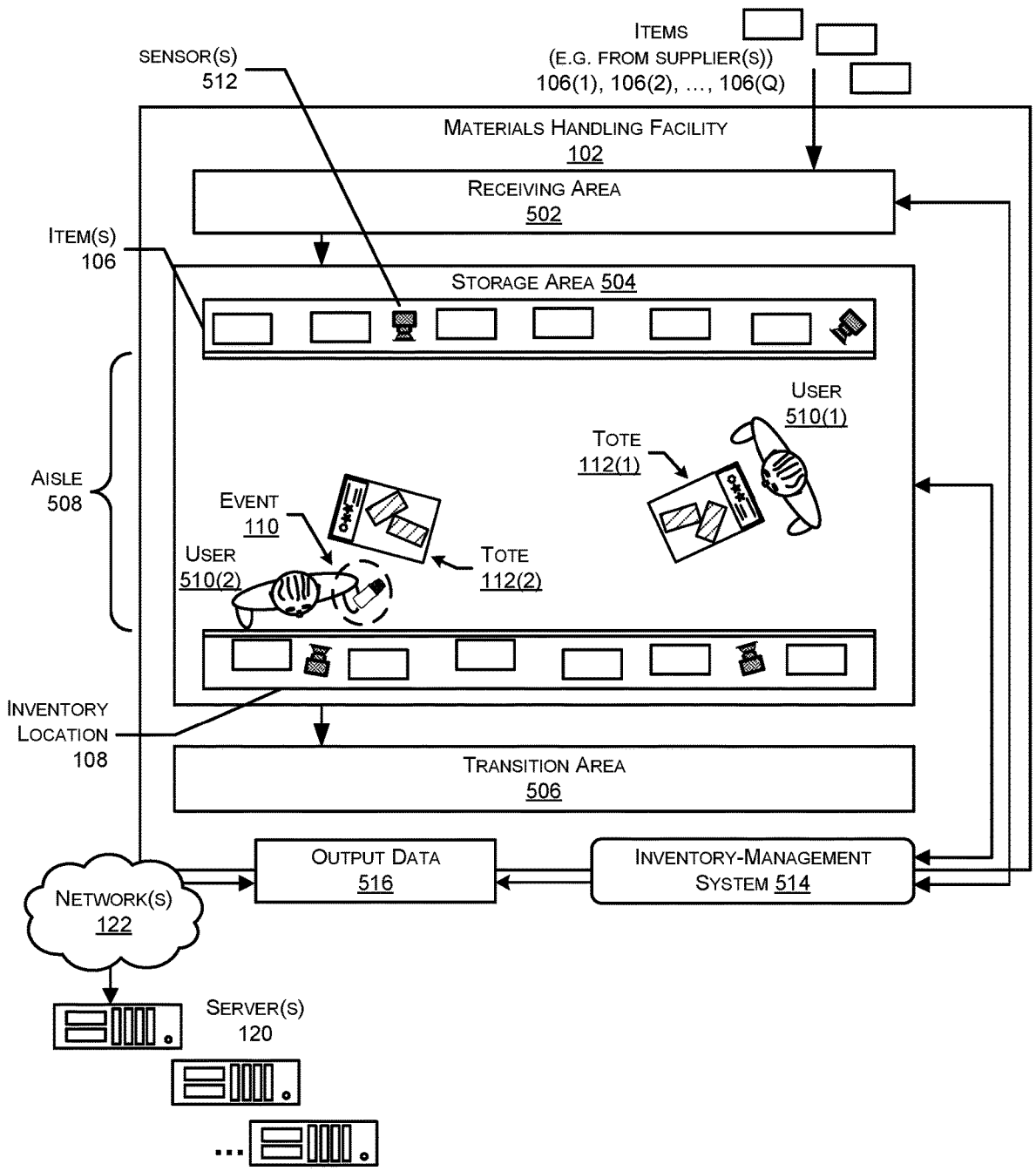
FIG. 5 illustrates an example materials handling facility in which the techniques for automatically identifying item changes and updating planogram data may be implemented.
Figure 6:
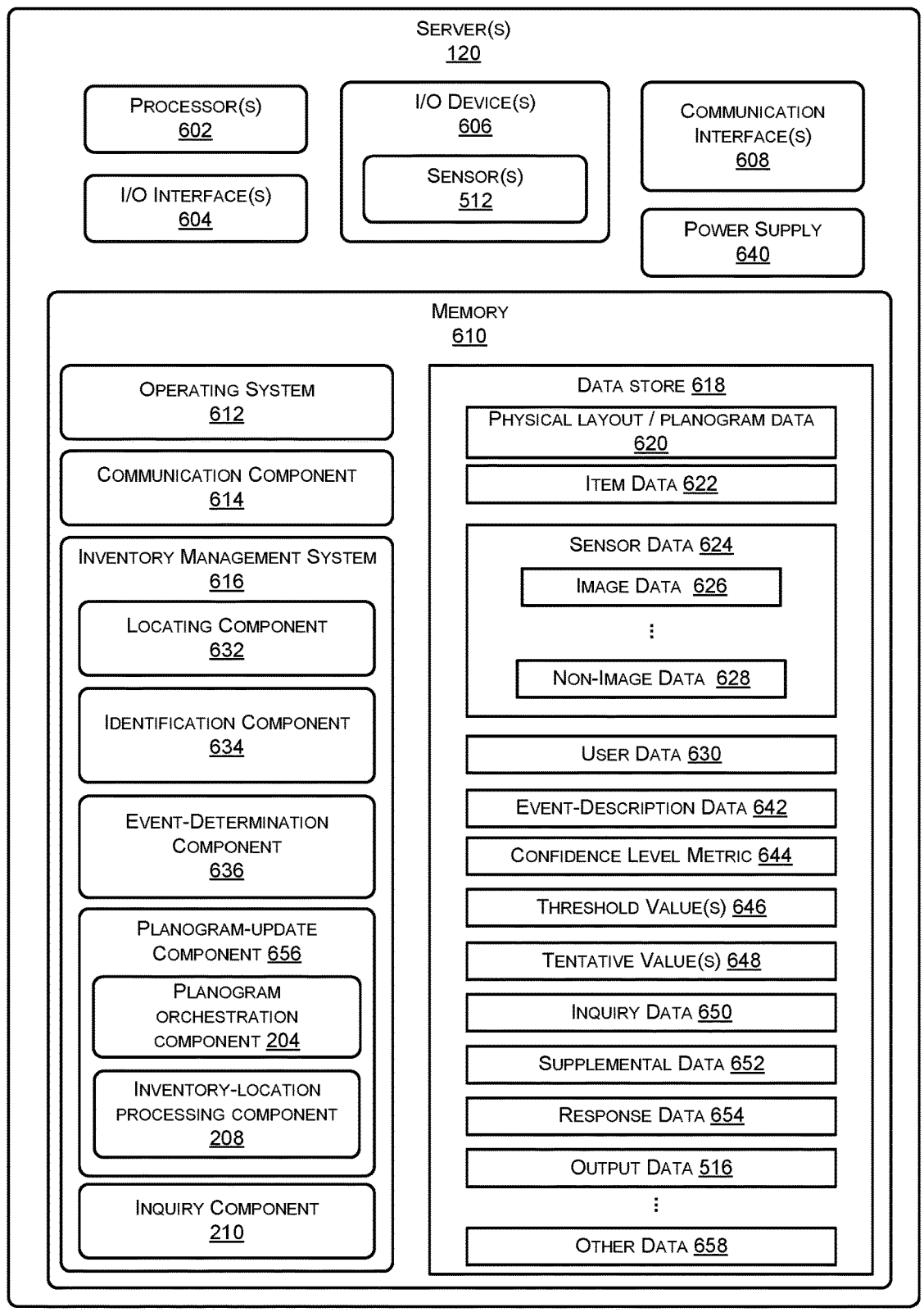
FIG. 6 illustrates example components of one or more systems configured to support an inventory-management system that may, in part, be configured to update planogram data using the techniques described herein.

FIGS. 5 and 6 represent an illustrative materials handling environment, such as the materials handling facility 102, in which the techniques described herein may be applied. However, the following description is merely one illustrative example of an industry and environment in which the techniques described herein may be utilized.

An implementation of a materials handling facility 102 configured to store and manage inventory items is illustrated in FIG. 5. A materials handling facility 102 (facility) comprises one or more physical structures or areas within which one or more items 106(1), 106(2), . . . , 106(Q) (generally denoted as 106) may be held. As used in this disclosure, letters in parenthesis such as "(Q)" indicate an integer result. The items 106 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 502, a storage area 504, and a transition area 506. The receiving area 502 may be configured to accept items 106, such as from suppliers, for intake into the facility 102. For example, the receiving area 502 may include a loading dock at which trucks or other freight conveyances unload the items 106.

The storage area 504 is configured to store the items 106. The storage area 504 may be arranged in various physical configurations. In one implementation, the storage area 504 may include one or more aisles 508. The aisle 508 may be configured with, or defined by, inventory locations 108 on one or both sides of the aisle 508. The inventory locations 108 may include one or more of shelves, racks, cases, cabinets, bins, floor locations, or other suitable storage mechanisms for holding or storing the items 106. The inventory locations 108 may be affixed to the floor or another portion of the facility's structure, or may be movable such that the arrangements of aisles 508 may be reconfigurable. In some implementations, the inventory locations 108 may be configured to move independently of an outside operator. For example, the inventory locations 108 may comprise a rack with a power source and a motor, operable by a computing device to allow the rack to move from one location within the facility 102 to another. As described above, inventory locations 108 may include one or more portions (e.g., lanes), each configured to hold one or more items.

One or more users(1), 510(2), . . . , 510(U), totes 112(1), 112(2), . . . , 112(T) (generally denoted as 112) or other material handling apparatus may move within the facility 102. For example, the users may move about within the facility 102 to pick or place the items 106 in various inventory locations 108, placing them on the totes 112 for ease of transport. As described above, the users may comprise users acquiring items for their consumption (e.g., consumers) and/or users that are associates (e.g., employees, volunteers, etc.) of the facility. An individual tote 112 is configured to carry or otherwise transport one or more items 106. For example, a tote 112 may include a basket, a cart, a bag, and so forth. In other implementations, other agencies such as robots, forklifts, cranes, aerial drones, and so forth, may move about the facility 102 picking, placing, or otherwise moving the items 106.

One or more sensors 512 may be configured to acquire information in the facility 102. The sensors 512 in the facility 102 may include sensors fixed in the environment (e.g., ceiling-mounted cameras) or otherwise, such as sensors in the possession of users (e.g., mobile phones, tablets, etc.). The sensors 512 may include, but are not limited to, cameras, weight sensors, radio frequency (RF) receivers, temperature sensors, humidity sensors, vibration sensors, and so forth. The sensors 512 may be stationary or mobile, relative to the facility 102. For example, the inventory locations 108 may contain cameras configured to acquire images of pick or placement of items 106 on shelves, of the users(1) and 510(2) in the facility 102, and so forth. In another example, the floor of the facility 102 may include weight sensors configured to determine a weight of the users or other object thereupon.

During operation of the facility 102, the sensors 512 may be configured to provide information suitable for identifying new locations of objects or other occurrences within the facility 102. For example, a series of images acquired by a camera may indicate removal of an item 106 from a particular inventory location 108 by one of the users and placement of the item 106 on or at least partially within one of the totes 112.

While the storage area 504 is depicted as having one or more aisles 508, inventory locations 108 storing the items 106, sensors 512, and so forth, it is understood that the receiving area 502, the transition area 506, or other areas of the facility 102 may be similarly equipped. Furthermore, the arrangement of the various areas within the facility 102 is depicted functionally rather than schematically. For example, multiple different receiving areas, storage areas, and transition areas may be interspersed rather than segregated in the facility 102.

The facility 102 may include, or be coupled to, an inventory management system 616. The inventory management system 616 is configured to identify interactions with and between users, devices such as sensors 512, robots, material handling equipment, computing devices, and so forth, in one or more of the receiving area 502, the storage area 504, or the transition area 506. These interactions may include one or more events 110. For example, events 110 may include the entry of the user to the facility 102, stocking of items 106 at an inventory location 108, picking of an item 106 from an inventory location 108, returning of an item 106 to an inventory location 108, placement of an item 106 within a tote 112, movement of users relative to one another, gestures by the users, and so forth. Other events 110 involving users may include the user providing authentication information in the facility 102, using a computing device at the facility 102 to authenticate identity to the inventory management system 616, and so forth. Some events 110 may involve one or more other objects within the facility 102. For example, the event 110 may comprise movement within the facility 102 of an inventory location 108, such as a counter mounted on wheels. Events 110 may involve one or more of the sensors 512. For example, a change in operation of a sensor 512, such as a sensor failure, change in alignment, and so forth, may be designated as an event 110. Continuing the example, movement of a camera 512(1) resulting in a change in the orientation of the field of view 1228 (such as resulting from someone or something bumping the camera 512(1)) (e.g. camera) may be designated as an event 110.

By determining the occurrence of one or more of the events 110, the inventory management system 616 may generate output data 516. The output data 516 comprises information about the event 110. For example, where the event 110 comprises an item 106 being removed from an inventory location 108, the output data 516 may comprise an item identifier indicative of the particular item 106 that was removed from the inventory location 108 and a user identifier of a user that removed the item.

The inventory management system 616 may use one or more automated systems to generate the output data 516. For example, an artificial neural network, one or more classifiers, or other automated machine learning techniques may be used to process the sensor data from the one or more sensors 512 to generate output data 516. The automated systems may operate using probabilistic or non-probabilistic techniques. For example, the automated systems may use a Bayesian network. In another example, the automated systems may use support vector machines to generate the output data 516 or the tentative results. The automated systems may generate confidence level data that provides information indicative of the accuracy or confidence that the output data 516 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 106, user, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user may pick an item 106(1) such as a perfume bottle that is generally cubical in shape from the inventory location 108. Other items 106 at nearby inventory locations 108 may be predominately spherical. Based on the difference in shape (cube vs. sphere) from the adjacent items, and the correspondence in shape with the previously stored image of the perfume bottle item 106(1) (cubical and cubical), the confidence level that the user 106 has picked up the perfume bottle item 106(1) is high.

In some situations, the automated techniques may be unable to generate output data 516 with a confidence level above a threshold result. For example, the automated techniques may be unable to distinguish which user in a crowd of users has picked up the item 106 from the inventory location 108. In other situations, it may be desirable to provide human confirmation of the event 110 or of the accuracy of the output data 516. For example, some items 106 may be deemed age restricted such that they are to be handled only by users above a minimum age threshold.

In instances where human confirmation is desired, sensor data associated with an event 110 may be processed to generate inquiry data. The inquiry data may include a subset of the sensor data associated with the event 110. The inquiry data may also include one or more of one or more tentative results as determined by the automated techniques, or supplemental data. The subset of the sensor data may be determined using information about the one or more sensors 512. For example, camera data such as the location of the camera within the facility 102, the orientation of the camera, and a field of view of the camera may be used to determine if a particular location within the facility 102 is within the field of view. The subset of the sensor data may include images that may show the inventory location 108 or that the item 106 was stowed. The subset of the sensor data may also omit images from other cameras that did not have that inventory location 108 in the field of view. The field of view may comprise a portion of the scene in the facility 102 that the sensor 512 is able to generate sensor data about.

Continuing the example, the subset of the sensor data may comprise a video clip acquired by one or more cameras having a field of view that includes the item 106. The tentative results may comprise the "best guess" as to which items 106 may have been involved in the event 110. For example, the tentative results may comprise results determined by the automated system that have a confidence level above a minimum threshold.

The facility 102 may be configured to receive different kinds of items 106 from various suppliers and to store them until a customer orders or retrieves one or more of the items 106. A general flow of items 106 through the facility 102 is indicated by the arrows of FIG. 5. Specifically, as illustrated in this example, items 106 may be received from one or more suppliers, such as manufacturers, distributors, wholesalers, and so forth, at the receiving area 502. In various implementations, the items 106 may include merchandise, commodities, perishables, or any suitable type of item 106, depending on the nature of the enterprise that operates the facility 102. The receiving of the items 106 may comprise one or more events 110 for which the inventory management system 616 may generate output data 516.

Upon being received from a supplier at receiving area 502, the items 106 may be prepared for storage. For example, items 106 may be unpacked or otherwise rearranged. The inventory management system 616 may include one or more software applications executing on a computer system to provide inventory management functions based on the events 110 associated with the unpacking or rearrangement. These inventory management functions may include maintaining information indicative of the type, quantity, condition, cost, location, weight, or any other suitable parameters with respect to the items 106. The items 106 may be stocked, managed, or dispensed in terms of countable, individual units or multiples, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 502, items 106 may be stored within the storage area 504. In some implementations, like items 106 may be stored or displayed together in the inventory locations 108 such as in bins, on shelves, hanging from pegboards, and so forth. In this implementation, all items 106 of a given kind are stored in one inventory location 108. In other implementations, like items 106 may be stored in different inventory locations 108. For example, to optimize retrieval of certain items 106 having frequent turnover within a large physical facility 102, those items 106 may be stored in several different inventory locations 108 to reduce congestion that might occur at a single inventory location 108. Storage of the items 106 and their respective inventory locations 108 may comprise one or more events 110.

When a customer order specifying one or more items 106 is received, or as a user progresses through the facility 102, the corresponding items 106 may be selected or "picked" from the inventory locations 108 containing those items 106. In various implementations, item picking may range from manual to completely automated picking. For example, in one implementation, a user may have a list of items 106 they desire and may progress through the facility 102 picking items 106 from inventory locations 108 within the storage area 504 and placing those items 106 into a tote 112. In other implementations, employees of the facility 102 may pick items 106 using written or electronic pick lists derived from customer orders. These picked items 106 may be placed into the tote 112 as the employee progresses through the facility 102. Picking may comprise one or more events 110, such as the user in moving to the inventory location 108, retrieval of the item 106 from the inventory location 108, and so forth.

After items 106 have been picked, they may be processed at a transition area 506. The transition area 506 may be any designated area within the facility 102 where items 106 are transitioned from one location to another or from one entity to another. For example, the transition area 506 may be a packing station within the facility 102. When the item 106 arrives at the transition area 506, the items 106 may be transitioned from the storage area 504 to the packing station. The transitioning may comprise one or more events 110. Information about the transition may be maintained by the inventory management system 616 using the output data 516 associated with those events 110.

In another example, if the items 106 are departing the facility 102 a list of the items 106 may be obtained and used by the inventory management system 616 to transition responsibility for, or custody of, the items 106 from the facility 102 to another entity. For example, a carrier may accept the items 106 for transport with that carrier accepting responsibility for the items 106 indicated in the list. In another example, a customer may purchase or rent the items 106 and remove the items 106 from the facility 102. The purchase or rental may comprise one or more events 110.

The inventory management system 616 may access or generate sensor data about the facility 102 and the contents therein including the items 106, the users, the totes 112, and so forth. The sensor data may be acquired by one or more of the sensors 512, data provided by other systems, and so forth. For example, the sensors 512 may include cameras configured to acquire image data of scenes in the facility 102. The image data may comprise still images, video, or a combination thereof. The image data may be processed by the inventory management system 616 to determine a location of the user, the tote 112, the identity of the user, and so forth. As used herein, the identity of the user may represent a unique identifier of the user (e.g., name, number associated with user, username, etc.), an identifier that distinguishes the user amongst other users being identified with the environment, or the like.

The inventory management system 616, or systems coupled thereto, may be configured to identify the user, as well as to determine other candidate users. In one implementation, this determination may comprise comparing sensor data with previously stored identity data. For example, the user may be identified by showing their face to a facial recognition system, by presenting a token carrying authentication credentials, providing a fingerprint, scanning a barcode or other type of unique identifier upon entering the facility, and so forth. Identity of the user may be determined before, during, or after entry to the facility 102. Determination of the user's identity may comprise comparing sensor data associated with the user in the facility 102 to previously stored user data.

In some instances, the inventory management system group users within the facility into respective sessions. That is, the inventory management system 616 may utilize the sensor data to determine groups of users that are effectively "together" (e.g., shopping together). In some instances, a particular session may include multiple users that entered the facility 102 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 112. Noting the child and the mother as belonging to the same session may increase the chances of successfully adding the box of cereal to the virtual shopping cart of the mother.

By determining the occurrence of one or more events 110 and the output data 516 associated therewith, the inventory management system 616 is able to provide one or more services to the users of the facility 102. By utilizing one or more human associates to process inquiry data and generate response data that may then be used to produce output data 516, overall accuracy of the system may be enhanced. The enhanced accuracy may improve the user experience of the one or more users of the facility 102. In some examples, the output data 516 may be transmitted over a network 122 to one or more servers 120.

FIG. 6 illustrates a block diagram of the one or more servers 120. The servers 120 may be physically present at the facility 102, may be accessible by the network 122, or a combination of both. The servers 120 do not require end-user knowledge of the physical location and configuration of the system that delivers the services. Common expressions associated with the servers 120 may include "on-demand computing," "software as a service (SaaS)," "cloud services," "data centers," and so forth. Services provided by the servers 120 may be distributed across one or more physical or virtual devices.

The servers 120 may include one or more hardware processors 602 (processors) configured to execute one or more stored instructions. The processors 602 may comprise one or more cores. The servers 120 may include one or more input/output (I/O) interface(s) 604 to allow the processor 602 or other portions of the servers 120 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, and so forth.

The servers 120 may also include one or more communication interfaces 608. The communication interfaces 608 are configured to provide communications between the servers 120 and other devices, such as the sensors 512, the interface devices, routers, and so forth. The communication interfaces 608 may include devices configured to couple to personal area networks (PANs), wired and wireless local area networks (LANs), wired and wireless wide area networks (WANs), and so forth. For example, the communication interfaces 608 may include devices compatible with Ethernet, Wi-Fi™, and so forth. The servers 120 may also include one or more busses or other internal communications hardware or software that allow for the transfer of data between the various modules and components of the servers 120.

The servers 120 may also include a power supply 640. The power supply 640 is configured to provide electrical power suitable for operating the components in the servers 120.

As shown in FIG. 6, the servers 120 includes one or more memories 610. The memory 610 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 610 provides storage of computer-readable instructions, data structures, program modules, and other data for the operation of the servers 120. A few example functional modules are shown stored in the memory 610, although the same functionality may alternatively be implemented in hardware, firmware, or as a system on a chip (SOC).

The memory 610 may include at least one operating system (OS) component 612. The OS component 612 is configured to manage hardware resource devices such as the I/O interfaces 604, the communication interfaces 608, and provide various services to applications or components executing on the processors 602. The OS component 612 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 610. These components may be executed as foreground applications, background tasks, daemons, and so forth. A communication component 614 may be configured to establish communications with one or more of the sensors 512, one or more of the devices used by associates, other servers 120, one or more other I/O devices 606, or other devices. The communications may be authenticated, encrypted, and so forth.

The memory 610 may store an inventory management system 616. The inventory management system 616 may perform an array of operations, such as determine movement of items 106 in the facility 102, generate user interface data, identify events that occur within the facility, update virtual carts of users, update planogram data as described above, and so forth.

The inventory management system 616 may access information stored in one or more data stores 618 in the memory 610. The data store 618 may use a flat file, database, linked list, tree, executable code, script, or other data structure to store the information. In some implementations, the data store 618 or a portion of the data store 618 may be distributed across one or more other devices including other servers 120, network attached storage devices, and so forth.

The data store 618 may include physical layout/planogram data 620. The data 620 provides a mapping of physical locations within the physical layout of devices and objects such as the sensors 512, inventory locations 108, and so forth. The data 620 may indicate the coordinates within the facility 102 of an inventory location 108, sensors 512 within view of that inventory location 108, and so forth. For example, the physical layout data 620 may include camera data comprising one or more of a location within the facility 102 of a camera 512(1), orientation of the camera 512(1), the operational status, and so forth. Continuing example, the physical layout data 620 may indicate the coordinates of the camera 512(1), pan and tilt information indicative of a direction that the field of view 1228 is oriented along, whether the camera 512(1) is operating or malfunctioning, and so forth. The data 620 may also include the planogram data discussed above with reference to FIGS. 2-3. This planogram data may indicate locations of items in the facility, with the locations being indicated by coordinates, inventory locations (e.g., shelfs), portions of inventory locations (e.g., lanes), and/or the like.

In some implementations, the inventory management system 616 may access the physical layout data 620 to determine if a location associated with the event 110 is within the field of view of one or more sensors 512. Continuing the example above, given the location within the facility 102 of the event 110 and the camera data, the inventory management system 616 may determine the cameras that may have generated images of the event 110.

The item data 622 comprises information associated with the items 106. The information may include SKU or other product-identifier information, price, quantity on hand, weight, expiration date, images of the item 106, detail description information, ratings, ranking, and so forth. The inventory management system 616 may store information associated with inventory management functions in the item data 622.

The data store 618 may also include sensor data 624. The sensor data 624 comprises information acquired from, or based on, the one or more sensors 512. For example, the sensor data 624 may comprise 3D information about an object in the facility 102. As described above, the sensors 512 may include a camera 512(1), which is configured to acquire one or more images. These images may be stored as the image data 626. The image data 626 may comprise information descriptive of a plurality of picture elements or pixels. Non-image data 628 may comprise information from other sensors 512, such as input from the microphones, weight sensors, and so forth.

User data 630 may also be stored in the data store 618. The user data 630 may include identity data (including whether the user is an associate of the facility), information indicative of a profile, purchase history, location data, images of the user, demographic data, and so forth. Individual users or groups of users may selectively provide user data 630 for use by the inventory management system 616. The individual users or groups of users may also authorize collection of the user data 630 during use of the facility 102 or access to user data 630 obtained from other systems. For example, the user may opt-in to collection of the user data 630 to receive enhanced services while using the facility 102.

In some implementations, the user data 630 may include information designating a user for special handling. For example, the user data 630 may indicate that a particular user has been associated with an increased number of errors with respect to output data 516. The inventory management system 616 may be configured to use this information to apply additional scrutiny to the events 110 associated with this user. For example, events 110 that include an item 106 having a cost or result above the threshold amount may be provided to the associates for processing regardless of the determined level of confidence in the output data 516 as generated by the automated system.

The inventory management system 616 may include one or more of a locating component 632, an identification component 634, an event-determination component 636, an planogram-update component 656, and the inquiry component 210.

The locating component 632 functions to locate items or users within the environment of the facility to allow the inventory management system 616 to assign certain events to the correct users. That is, the locating component 632 may assign unique identifiers to users as they enter the facility and, with the users' consent, may locating the position of the users throughout the facility 102 over the time they remain in the facility 102. The locating component 632 may perform this locating using sensor data 624, such as the image data 626. For example, the locating component 632 may receive the image data 626 and may use facial-recognition techniques to identify users from the images. After identifying a particular user within the facility, the locating component 632 may then locating the user within the images as the user moves throughout the facility 102. Further, should the locating component 632 temporarily "lose" a particular user, the locating component 632 may again attempt to identify the users within the facility based on facial recognition, and/or using other techniques such as voice recognition, or the like. The locating component 632 may generate the locating data discussed above with reference to FIGS. 1-4C for the purpose of identifying associates in the facility. This locating data may, in turn, be used to identify potential stocking or restocking events, as described above.

Upon receiving the indication of the time and location of the event in question, the locating component 632 may query the data store 618 to determine which one or more users were at or within a threshold distance of the location of the event at the particular time of the event. Further, the locating component 632 may assign different confidence levels to different users, with the confidence levels indicating how likely it is that each corresponding user is the user that is in fact associated with the event of interest.

The locating component 632 may access the sensor data 624 in order to determine this location data of the user and/or items. The location data provides information indicative of a location of an object, such as the item 106, the user, the tote 112, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 108 along a heading of 169°, and so forth. For example, the location data may indicate that the user(1) is 25.2 m along the aisle 508(1) and standing in front of the inventory location 108. In comparison, a relative location may indicate that the user(1) is 32 cm from the tote 112 at a heading of 73° with respect to the tote 114. The location data may include orientation information, such as which direction the user is facing. The orientation may be determined by the relative direction the user's body is facing. In some implementations, the orientation may be relative to the interface device. Continuing the example, the location data may indicate that the user(1) is oriented with a heading of 0°, or looking north. In another example, the location data may indicate that the user is facing towards the interface device.

The identification component 634 is configured to identify an object. In one implementation, the identification component 634 may be configured to identify an item 106. In another implementation, the identification component 634 may be configured to identify the user. For example, the identification component 634 may use facial recognition techniques to process the image data 626 and determine the identity data of the user depicted in the images by comparing the characteristics in the image data 626 with previously stored results. The identification component 634 may also access data from other sensors 512, such as from an RFID reader, an RF receiver, fingerprint sensors, and so forth.

The event determination component 636 is configured to process the sensor data 624 and generate output data 516, which may comprise the "event data" or "event description data" discussed above. The event determination component 636 may access information stored in the data store 618 including, but not limited to, event description data 642, confidence levels 644, or threshold values 646.

The event description data 642 comprises information indicative of one or more events 110. For example, the event description data 642 may comprise predefined profiles that designate movement of an item 106 from an inventory location 108 with the event 110 of "pick". The event description data 642 may be manually generated or automatically generated. The event description data 642 may include data indicative of triggers associated with events occurring in the facility 102. An event may be determined as occurring upon detection of the trigger. For example, sensor data 624 such as a change in weight from a weight sensor at an inventory location 108 may trigger detection of an event of an item 106 being added or removed from the inventory location 108. In another example, the trigger may comprise an image of the user reaching a hand toward the inventory location 108. In yet another example, the trigger may comprise two or more users approaching to within a threshold distance of one another.

The event determination component 636 may process the sensor data 624 using one or more techniques including, but not limited to, artificial neural networks, classifiers, decision trees, support vector machines, Bayesian networks, and so forth. For example, the event determination component 636 may use a decision tree to determine occurrence of the "pick" event 110 based on sensor data 624. The event determination component 636 may further use the sensor data 624 to determine one or more tentative results 648. The one or more tentative results 648 comprise data associated with the event 110. For example, where the event 110 comprises a disambiguation of users, the tentative results 648 may comprise a list of possible user identities. In another example, where the event 110 comprises a disambiguation between items, the tentative results 648 may comprise a list of possible item identifiers. In some implementations, the tentative result 648 may indicate the possible action. For example, the action may comprise the user picking, placing, moving an item 106, damaging an item 106, providing gestural input, and so forth.

In some implementations, the tentative results 648 may be generated by other components. For example, the tentative results 648 such as one or more possible identities or locations of the user involved in the event 110 may be generated by the locating component 632. In another example, the tentative results 648 such as possible items 106 that may have been involved in the event 110 may be generated by the identification component 634.

The event determination component 636 may be configured to provide a confidence level 644 associated with the determination of the tentative results 648. The confidence level 644 provides indicia as to the expected level of accuracy of the tentative result 648. For example, a low confidence level 644 may indicate that the tentative result 648 has a low probability of corresponding to the actual circumstances of the event 110. In comparison, a high confidence level 644 may indicate that the tentative result 648 has a high probability of corresponding to the actual circumstances of the event 110.

In some implementations, the tentative results 648 having confidence levels 644 that exceed the threshold result 646 may be deemed to be sufficiently accurate and thus may be used as the output data 516. For example, the event determination component 636 may provide tentative results 648 indicative of the three possible items corresponding to the "pick" event 110. The confidence levels 644 associated with the possible items may be 25%, 70%, 95%, respectively. Continuing the example, the threshold result may be set such that confidence level 644 of 95% are deemed to be sufficiently accurate. As a result, the event determination component 636 may designate the "pick" event 110 as involving item associated with the 95% confidence level.

The planogram-update component 656 may include the planogram orchestration component 204 and the inventory-location processing component 208 and may operate as described above. For example, the planogram-update component 656 may receive information such as the event data, the locating data, and the image data to determine whether a planogram change has occurred within the facility. If the planogram-update component 656 identifies a change with a confidence level that is greater than a threshold confidence level, then the component 656 may update the data 620 to indicate the change.

If, however, the planogram-update component 656 does not identify a change with a threshold amount of confidence, then the component 656 may invoke the inquiry component 210 as described above. In general, the inquiry component 210 may be configured to use at least a portion of the sensor data 624 associated with the event 110 to generate inquiry data 650. In some implementations, the inquiry data 650 may include one or more of the tentative results 648 or supplemental data 652. The inquiry component 210 may be configured to provide inquiry data 650 to one or more devices associated with one or more human associates.

An associate user interface is presented on the respective devices of associates. The associate may generate response data 654 by selecting a particular tentative result 648, entering new information, indicating that they are unable to answer the inquiry, and so forth.

The supplemental data 652 comprises information associated with the event 110 or that may be useful in interpreting the sensor data 624. For example, the supplemental data 652 may comprise previously stored images of the items 106. In another example, the supplemental data 652 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 626 during presentation to an associate.

The inquiry component 210 processes the response data 654 provided by the one or more associates. The processing may include calculating one or more statistical results associated with the response data 654. For example, statistical results may include a count of the number of times associates selected a particular tentative result 648, determination of a percentage of the associates that selected a particular tentative result 648, and so forth.

The inquiry component 210 is configured to generate the output data 516 based at least in part on the response data 654. For example, given that a majority of the associates returned response data 654 indicating that the item 106 associated with the "pick" event 110 is item 106(5), the output data 516 may indicate that the item 106(5) was picked.

The inquiry component 210 may be configured to selectively distribute inquiries to particular associates. For example, some associates may be better suited to answering particular types of inquiries. Performance data, such as statistical data about the performance of the associates, may be determined by the inquiry component 210 from the response data 654 provided by the associates. For example, information indicative of a percentage of different inquiries in which the particular associate selected response data 654 that disagreed with the majority of associates may be maintained. In some implementations, test or practice inquiry data 650 having a previously known correct answer may be provided to the associate for training or quality assurance purposes. The determination of the set of associates to use may be based at least in part on the performance data.

By using the inquiry component 210, the event determination component 636 may be able to provide high reliability output data 516 that accurately represents the event 110. The output data 516 generated by the inquiry component 210 from the response data 654 may also be used to further train the automated systems used by the inventory management system 616. For example, the sensor data 624 and the output data 516, based on response data 654, may be provided to one or more of the components of the inventory management system 616 for training in process improvement. Continuing the example, this information may be provided to an artificial neural network, Bayesian network, and so forth, to further train these systems such that the confidence level 644 and the tentative results 648 produced in the future for the same or similar input is improved.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
causing each of multiple cameras within a facility to generate image data of a respective portion of the facility;
storing, in one or more datastores, first planogram data indicating that a first item identifier of a first item is associated with an inventory location in the facility;
identifying a restocking event in at the inventory location;
identifying, from the multiple cameras, one or more cameras having a field-of-view (FOV) that includes the inventory location;
acquiring, based at least in part on the identifying of the restocking event, first image data generated by the one or more cameras prior to the restocking event and second image data generated by the one or more cameras after the restocking event;
analyzing the first image data with respect to the second image data; and
storing, in the one or more datastores, second planogram data indicating that a second item identifier of a second item is associated with the inventory location.

2. The method as recited in claim 1, further comprising:
receiving, after storing the first planogram data and prior to storing the second planogram data, an indication that an item has been placed at the inventory location; and
wherein the identifying the restocking event comprises identifying the restocking event at least partly in response to the receiving of the indication that the item has been placed at the inventory location.

3. The method as recited in claim 1, further comprising:
receiving, after storing the first planogram data and prior to storing the second planogram data, an indication that an associate of the facility is near the inventory location; and
wherein the identifying the restocking event comprises identifying the restocking event at least partly in response to the receiving of the indication that the associate of the facility is near the inventory location.

4. The method as recited in claim 1, further comprising:
receiving, after storing the first planogram data and prior to storing the second planogram data, data indicating the second item identifier or another item identifier associated with the second item has been received from a mobile device of an associate of the facility; and
wherein the identifying the restocking event comprises identifying the restocking event at least partly in response to the receiving of the data indicating the second item identifier or the another item identifier associated with the second item has been received from the mobile device of the associate of the facility.

5. The method as recited in claim 1, further comprising:
storing first timestamp data indicating a first time range associated with the first planogram data; and
storing second timestamp data indicating a second time range associated with the second planogram data.

6. The method as recited in claim 1, further comprising:
receiving, after storing the first planogram data and prior to storing the second planogram data, first data indicating that a first user has acquired an item from the first inventory location;
storing a first association between the first user and the first item identifier;
receiving, after storing the second planogram data, second data indicating that a second user has acquired an item from the first inventory location; and
storing a second association between the second user and the second item identifier.

7. A system comprising:
one or more processors;
one or more datastores; and
one or more computer-readable media storing computer-executable instructions that, when executed, cause the one or more processors to perform acts comprising:
causing each of multiple cameras within a facility to generate image data of a respective portion of the facility;
storing, in the one or more datastores, first planogram data indicating that a first item identifier of a first item is associated with an inventory location in the facility;
identifying a restocking event in at the inventory location;
identifying, from the multiple cameras, one or more cameras having a field-of-view (FOV) that includes the inventory location;
acquiring, based at least in part on the identifying of the restocking event, first image data generated by the one or more cameras prior to the restocking event and second image data generated by the one or more cameras after the restocking event;
analyzing the first image data with respect to the second image data; and
storing, in the one or more datastores, second planogram data indicating that a second item identifier of a second item is associated with the inventory location.

8. The system as recited in claim 7, wherein the one or more computer-readable media further store computer-executable instructions that, when executed, cause the one or more processors to perform acts comprising:
receiving, after storing the first planogram data and prior to storing the second planogram data, an indication that an item has been placed at the inventory location; and
wherein the identifying the restocking event comprises identifying the restocking event at least partly in response to the receiving of the indication that the item has been placed at the inventory location.

9. The system as recited in claim 7, wherein the one or more computer-readable media further store computer-executable instructions that, when executed, cause the one or more processors to perform acts comprising:
receiving, after storing the first planogram data and prior to storing the second planogram data, an indication that an associate of the facility is near the inventory location; and
wherein the identifying the restocking event comprises identifying the restocking event at least partly in response to the receiving of the indication that the associate of the facility is near the inventory location.

10. The system as recited in claim 7, wherein the one or more computer-readable media further store computer-executable instructions that, when executed, cause the one or more processors to perform acts comprising:
receiving, after storing the first planogram data and prior to storing the second planogram data, data indicating the second item identifier or another item identifier associated with the second item has been received from a mobile device of an associate of the facility; and
wherein the identifying the restocking event comprises identifying the restocking event at least partly in response to the receiving of the data indicating the second item identifier or the another item identifier associated with the second item has been received from the mobile device of the associate of the facility.

11. The system as recited in claim 7, wherein the one or more computer-readable media further store computer-executable instructions that, when executed, cause the one or more processors to perform acts comprising:
storing first timestamp data indicating a first time range associated with the first planogram data; and
storing second timestamp data indicating a second time range associated with the second planogram data.

12. The system as recited in claim 7, wherein the one or more computer-readable media further store computer-executable instructions that, when executed, cause the one or more processors to perform acts comprising:
receiving, after storing the first planogram data and prior to storing the second planogram data, first data indicating that a first user has acquired an item from the first inventory location;
storing a first association between the first user and the first item identifier;
receiving, after storing the second planogram data, second data indicating that a second user has acquired an item from the first inventory location; and
storing a second association between the second user and the second item identifier.

13. One or more non-transitory computer-readable media storing computer-executable instructions that, when executed, cause one or more processors to perform acts comprising:
causing each of multiple cameras within a facility to generate image data of a respective portion of the facility;
storing, in one or more datastores, first planogram data indicating that a first item identifier of a first item is associated with an inventory location in the facility;
identifying a restocking event in at the inventory location;
identifying, from the multiple cameras, one or more cameras having a field-of-view (FOV) that includes the inventory location;
acquiring, based at least in part on the identifying of the restocking event, first image data generated by the one or more cameras prior to the restocking event and second image data generated by the one or more cameras after the restocking event;
analyzing the first image data with respect to the second image data; and
storing, in the one or more datastores, second planogram data indicating that a second item identifier of a second item is associated with the inventory location.

14. The one or more computer-readable media as recited in claim 13, further storing computer-executable instructions that, when executed, cause the one or more processors to perform acts comprising:
receiving, after storing the first planogram data and prior to storing the second planogram data, an indication that an item has been placed at the inventory location; and
wherein the identifying the restocking event comprises identifying the restocking event at least partly in response to the receiving of the indication that the item has been placed at the inventory location.

15. The one or more computer-readable media as recited in claim 13, further storing computer-executable instructions that, when executed, cause the one or more processors to perform acts comprising:
receiving, after storing the first planogram data and prior to storing the second planogram data, an indication that an associate of the facility is near the inventory location; and
wherein the identifying the restocking event comprises identifying the restocking event at least partly in response to the receiving of the indication that the associate of the facility is near the inventory location.

16. The one or more computer-readable media as recited in claim 13, further storing computer-executable instructions that, when executed, cause the one or more processors to perform acts comprising:
receiving, after storing the first planogram data and prior to storing the second planogram data, data indicating the second item identifier or another item identifier associated with the second item has been received from a mobile device of an associate of the facility; and
wherein the identifying the restocking event comprises identifying the restocking event at least partly in response to the receiving of the data indicating the second item identifier or the another item identifier associated with the second item has been received from the mobile device of the associate of the facility.

17. The one or more computer-readable media as recited in claim 13, further storing computer-executable instructions that, when executed, cause the one or more processors to perform acts comprising:
storing first timestamp data indicating a first time range associated with the first planogram data; and
storing second timestamp data indicating a second time range associated with the second planogram data.

18. The one or more computer-readable media as recited in claim 13, further storing computer-executable instructions that, when executed, cause the one or more processors to perform acts comprising:
receiving, after storing the first planogram data and prior to storing the second planogram data, first data indicating that a first user has acquired an item from the first inventory location;
storing a first association between the first user and the first item identifier;
receiving, after storing the second planogram data, second data indicating that a second user has acquired an item from the first inventory location; and
storing a second association between the second user and the second item identifier.

\* \* \* \* \*